US 8,687,628 B2

(12) United States Patent
Beshai

(10) Patent No.: US 8,687,628 B2
(45) Date of Patent: Apr. 1, 2014

(54) SCALABLE BALANCED SWITCHES

(75) Inventor: Maged E. Beshai, Stittsville (CA)

(73) Assignee: Rockstar Consortium USLP, Plano, TX (US)

( * ) Notice: Subject to any disclaimer, the term of this patent is extended or adjusted under 35 U.S.C. 154(b) by 1250 days.

(21) Appl. No.: 11/377,128

(22) Filed: Mar. 16, 2006

(65) Prior Publication Data

US 2007/0217405 A1    Sep. 20, 2007

(51) Int. Cl.
*H04L 12/50* (2006.01)
*H04Q 11/00* (2006.01)

(52) U.S. Cl.
USPC ........... 370/388; 370/229; 370/230; 370/235; 370/328; 370/370; 370/372; 370/389; 370/400; 370/465; 370/352

(58) Field of Classification Search
USPC ......... 370/229, 230, 235, 328, 400, 465, 352, 370/389, 369, 370, 371, 372
See application file for complete search history.

(56) References Cited

U.S. PATENT DOCUMENTS

| 6,243,361 | B1 * | 6/2001 | McMillen et al. ............ 370/254 |
| 6,307,852 | B1 * | 10/2001 | Fisher et al. .................. 370/352 |
| 6,510,135 | B1 * | 1/2003 | Almulhem et al. ........... 370/229 |
| 6,657,959 | B1 * | 12/2003 | Chong et al. ............... 370/230.1 |
| 7,292,580 | B2 * | 11/2007 | Ramamurthy et al. .. 370/395.42 |
| 7,319,695 | B1 * | 1/2008 | Agarwal et al. .............. 370/388 |
| 7,397,788 | B2 * | 7/2008 | Mies et al. .................... 370/351 |
| 7,426,210 | B1 * | 9/2008 | Miles et al. ................... 370/400 |
| 2002/0075540 | A1 * | 6/2002 | Munter ........................ 359/128 |
| 2002/0138784 | A1 * | 9/2002 | Mann et al. ....................... 714/6 |
| 2003/0191983 | A1 * | 10/2003 | Mann et al. ..................... 714/11 |
| 2003/0193937 | A1 | 10/2003 | Beshai et al. |
| 2003/0227926 | A1 * | 12/2003 | Ramamurthy et al. .. 370/395.42 |
| 2003/0228087 | A1 * | 12/2003 | Spivey et al. .................. 385/16 |
| 2004/0037558 | A1 | 2/2004 | Beshai |
| 2004/0143593 | A1 * | 7/2004 | Le Maut et al. .............. 707/102 |
| 2005/0002334 | A1 * | 1/2005 | Chao et al. .................... 370/230 |
| 2005/0047405 | A1 * | 3/2005 | Denzel et al. ................ 370/388 |
| 2005/0078666 | A1 | 4/2005 | Beshai |
| 2005/0111357 | A1 * | 5/2005 | Rogers ......................... 370/229 |
| 2005/0185641 | A1 | 8/2005 | Toschi |
| 2005/0207339 | A1 | 9/2005 | Beshai et al. |
| 2006/0168145 | A1 * | 7/2006 | Pitts ............................. 709/219 |
| 2007/0053356 | A1 * | 3/2007 | Konda .......................... 370/390 |
| 2007/0168494 | A1 * | 7/2007 | Liu et al. ...................... 709/224 |

OTHER PUBLICATIONS

Zhu, Keyao; "A Comprehensive Study on Next-Generation Optical Grooming Switches"; IEEE Journal on Selected Areas in Communications; vol. 21, No. 7; Sep. 2003; pp. 1173-1186.
Arekapudi, S. et al.; "Configuring a Load-Balanced Switch in Hardware"; Computer Systems Laboratory, Stanford University; 6 pgs.
Keslassy, I. et al.; "Optimal Load-Balancing"; Wakerly Stanford Graduate Fellowship; 11 pgs.

* cited by examiner

*Primary Examiner* — Hassan Phillips
*Assistant Examiner* — Lonnie Sweet
(74) *Attorney, Agent, or Firm* — Schmeiser, Olsen & Watts

(57) ABSTRACT

A balanced, bufferless switch scalable to high capacities and requiring less processing effort with less internal fabric expansion in comparison with prior-art switches. The balanced, bufferless switch employs a pre-switching or post-switching balanced-connector.

20 Claims, 18 Drawing Sheets

| Time-Interval | Channels accessing Switch-unit 0 | Channels accessing Switch-unit 1 | Channels accessing Switch-unit 2 | Channels accessing Switch-unit 3 |
|---|---|---|---|---|
| t=0 | 00 07 14 21 28 35 42 | 01 08 15 22 29 36 43 | 02 09 16 23 30 37 44 | 03 10 17 24 31 38 45 |
| t=1 | 00 13 19 25 31 37 43 | 01 07 20 26 32 38 44 | 02 08 14 27 33 39 45 | 03 09 15 21 34 40 46 |
| t=2 | 00 12 17 22 34 39 44 | 01 13 18 23 28 40 45 | 02 07 19 24 29 41 46 | 03 08 20 25 30 35 47 |
| t=3 | 00 11 15 26 30 41 45 | 01 12 16 27 31 35 46 | 02 13 17 21 32 36 47 | 03 07 18 22 33 37 48 |
| t=4 | 00 10 20 23 33 36 46 | 01 11 14 24 34 37 47 | 02 12 15 25 28 38 48 | 03 13 16 26 29 39 42 |
| t=5 | 00 09 18 27 29 38 47 | 01 10 19 21 30 39 48 | 02 11 20 22 31 40 42 | 03 12 14 23 32 41 43 |
| t=6 | 00 08 16 24 32 40 48 | 01 09 17 25 33 41 42 | 02 10 18 26 34 35 43 | 03 11 19 27 28 36 44 |

| Time-Interval | Channels accessing Switch-unit 4 | Channels accessing Switch-unit 5 | Channels accessing Switch-unit 6 |
|---|---|---|---|
| t=0 | 04 11 18 25 32 39 46 | 05 12 19 26 33 40 47 | 06 13 20 27 34 41 48 |
| t=1 | 04 10 16 22 28 41 47 | 05 11 17 23 29 35 48 | 06 12 18 24 30 36 42 |
| t=2 | 04 09 14 26 31 36 48 | 05 10 15 27 32 37 42 | 06 11 16 21 33 38 43 |
| t=3 | 04 08 19 23 34 38 42 | 05 09 20 24 28 39 43 | 06 10 14 25 29 40 44 |
| t=4 | 04 07 17 27 30 40 43 | 05 08 18 21 31 41 44 | 06 09 19 22 32 35 45 |
| t=5 | 04 13 15 24 33 35 44 | 05 07 16 25 34 36 45 | 06 08 17 26 28 37 46 |
| t=6 | 04 12 20 21 29 37 45 | 05 13 14 22 30 38 46 | 06 07 15 23 03 39 47 |

SCALABLE BALANCED SWITCHES

FIELD OF THE INVENTION

The present invention relates generally to large-scale switches useful in a communications network. More specifically, the present invention relates to large-scale, balanced switches as well as methods related to path finding in such switches.

BACKGROUND OF THE INVENTION

It is known to use arrangements of moderate-sized switch units to construct a high-capacity switch. A mesh interconnection of switch units is an efficient arrangement in comparison to cascaded multi-stage arrangements. A switch unit is a single-stage, non-blocking switching device having a plurality of input ports and a plurality of output ports. To provide fine granularity, time-sharing schemes, such as Time-Division-Multiplexing, may be used, and the switch units should have a low switching latency; on the order of a few nanoseconds, for example.

A core switch connecting distributed edge nodes may be based on an electronic switch fabric or an optical switch fabric. An edge node interfaces with data sources and sinks and is typically provided with buffers. An electronic-based core switch requires optical-electrical and electrical-optical interfaces with optical channels connecting the core switch to edge nodes or to other electronic-based core switches. An optical core switch switches optical signals without the need for optical-electrical and electrical-optical conversion. In addition, an optical core switch is compact and has the advantage of low power consumption.

There are, however, several challenges in constructing a large-scale, optical switch using a time-sharing scheme such as a conventional time-division-multiplexing scheme. While it is feasible to construct a slow-switching, optical switch unit of large dimension, 2000×2000 for example, a fast-switching, optical switch unit is limited to a relatively small dimension, 32×32, for example. This forces the use of multi-stage structures, such as a mesh structure, to construct a fast-switching, optical switch of large dimension. Due to the absence of buffers in the optical domain, at least with the present state of the art, establishing a connection through a time-shared, multi-stage structure requires a compound time-slot-matching process. A compound time-slot matching process of high order (third order or higher) may be computationally intensive and may also lead to relatively-low occupancy due to mismatch blocking as taught in the United States Patent Publication No. 2004/0037558 entitled "Modular High-Capacity Switch".

SUMMARY OF THE INVENTION

The present invention provides for improved large-scale, optical switches. In accordance with an aspect of the present invention, there is provided a balanced, bufferless switch for a communications network. Generally, the balanced, bufferless switches of the present invention comprise: a plurality of switch units, each switch unit having a plurality of inlet ports, a plurality of outlet ports connected to external traffic sinks, a plurality of outward ports connected to each other switch unit, and a plurality of inward ports connected to outward ports of each other switch unit; and a balanced-connector having a plurality of output ports connected to the inlet ports of the switch units and having a plurality of input ports. The balanced-connectors can be operative to equitably supply traffic received at the input ports to the switch units.

In accordance with another aspect, the invention provides methods of scheduling connections in balanced, bufferless switches. These methods may also be referred to herein as methods of path-finding. In a preferred embodiment, each input port of the balanced-connector connects to an external traffic source, each output port of the balanced-connector connects to a respective inlet port of the switch fabric and the balanced-connector cyclically connects each input port to each output port during a predetermined, repetitive, time frame organized in a plurality of time intervals, each interval having an integer number of time slots. A connection from an input port of the balanced-connector to an outlet port of a switch unit may require multiple, time slots per time frame. A preferred method of scheduling comprises selecting a specific time interval and determining an inlet port to which the specific input port connects during the specific time interval. For each time slot in the specific time interval, the method comprises ascertaining the occupancy state of a path from the inlet port to the outlet port through the switch units, and marking each time slot as allocable if the path is unoccupied.

In accordance with a further aspect of the present invention, there is provided a switch comprising: a balanced-connector including a plurality of connector output ports connecting to a plurality of sink nodes and a plurality of connector input ports; and a plurality of switch units, each switch unit having a plurality of inlet ports for receiving traffic from external traffic sources, a plurality of outlet ports connected to the balanced-connector's input ports, a plurality of outward ports for transmitting traffic to each other switch unit, and a plurality of inward ports for receiving traffic from each other switch unit. The balanced-connector is operative to enable collective switching of potential traffic from each source node to each sink node along direct paths through the switch units.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 9 illustrates access variation with time at switch units of the switch of FIG. 5.

FIG. 12 illustrates the connectivity, in accordance with the present invention, of the edge nodes shown in FIG. 11 to inlet ports of the switch in FIG. 10.

FIG. 15 illustrates a matrix in accordance with the present invention, which indicates the occupancy states of outlet ports of switch units and is usable in a time-slot-matching process of any order.

FIG. 16 illustrates a matrix in accordance with the present invention, which indicates the occupancy states on inter-switch-unit channels and is usable in a second-order (or a higher order) time-slot-matching process.

DETAILED DESCRIPTION OF THE INVENTION

Figure 1:
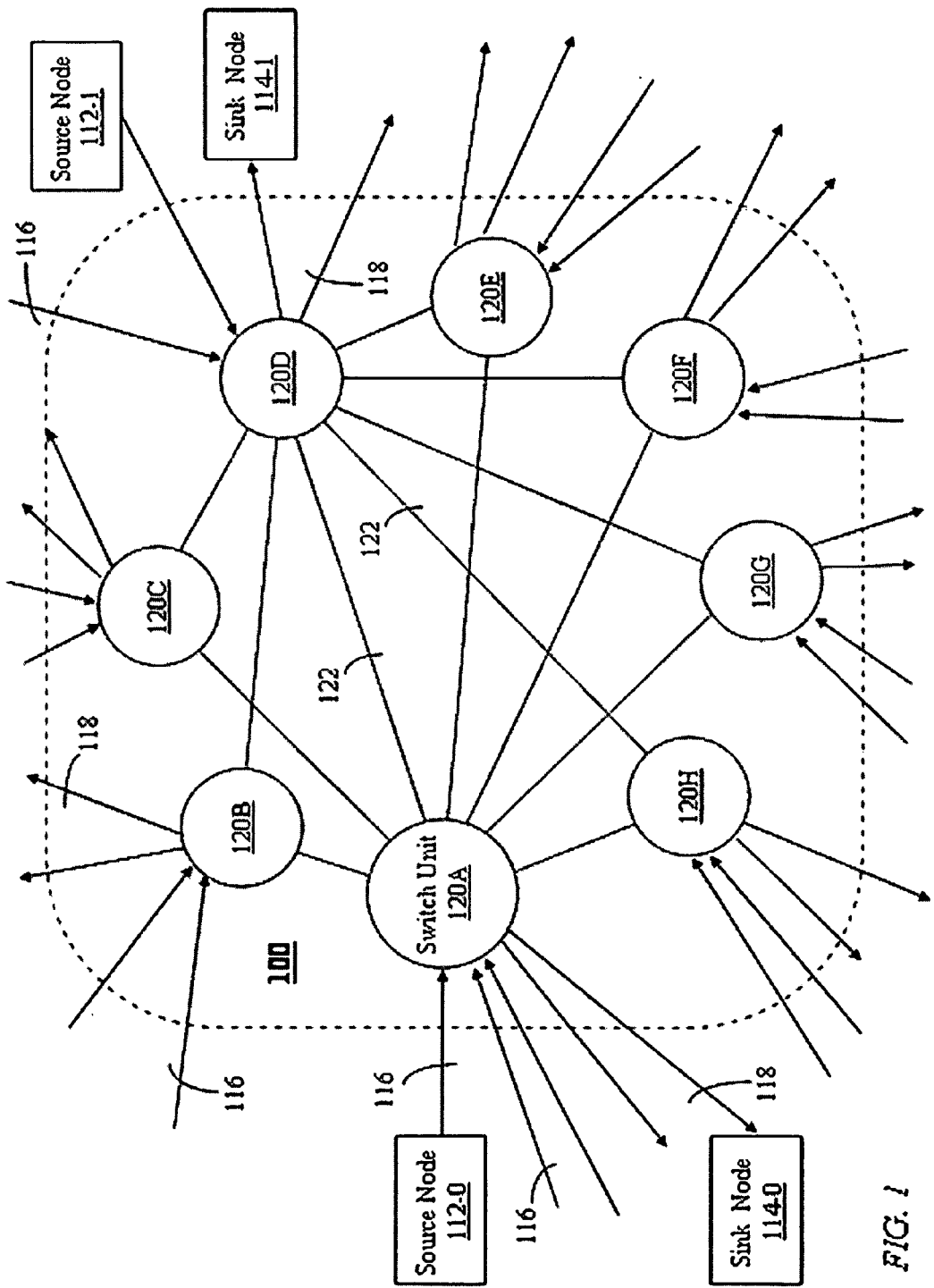
FIG. 1 illustrates a prior-art core switch comprising switch units interconnected in a full mesh structure and connecting to source nodes and sink nodes.

The present invention provides for modular time-shared optical switches capable of scaling to high capacities and requiring less processing effort with less internal fabric expansion in comparison with switches of the prior-art. The present invention also provides for methods of scheduling a connection using optical switches of the present invention.

An optical switch according to the present invention generally comprises a switch fabric and a balanced-connector. Although the invention applies to any bufferless switch, whether employing an electronic or an optical switching fabric, its use with an optical-switching fabric is more compelling due to the difficulty of providing buffers in the optical domain. The switch fabric of optical switches of the present invention generally comprise a meshed structure having a plurality of switch units with each switch unit having a plurality of inlet ports, a plurality of outlet ports connected to external traffic sinks, a plurality of outward ports connected to each other switch unit, and a plurality of inward ports connected to the plurality of outward ports of each other switch unit. Preferred balanced-connectors of the present invention comprise a plurality of connector output ports connected to the plurality of inlet ports of the switch units in the switch fabric and a plurality of connector input ports. The preferred balanced-connectors of the present invention are operative to equitably supply traffic received at the plurality of connector input ports to the inlet ports of switch units. The present invention is described herein with emphasis put on employing pre-switching balanced-connectors. However, it should be understood that advantageous embodiments of the present invention can be formed employing post-switching balanced-connectors. Switches employing pre-switching balanced-connectors are based on a technique of rotating access of an incoming channel to different inlet ports of a switch fabric. Switches employing post-switching balanced-connectors, on the other hand, are based on rotating access of an outgoing channel to outlet ports of the switch fabric. Whether pre-switching or post-switching, balanced-connectors balance the inner traffic load in the switch fabric, generally eliminating the need for two-link paths that each requires a third-order time-slot-matching process.

Cascaded Switch Units Versus Meshed Switch Units

Switch units of moderate dimension may be arranged in a cascaded multi-stage structure to produce switch fabrics of larger dimension. As is well known in the art, the number of stages in a cascaded structure is preferably an odd number, and the minimum number is three. The dimension of a switch having a cascaded structure or a meshed structure is determined primarily by the dimensions of the constituent switch units. Therefore, it is preferable to use the highest realizable switch-unit dimension for all switch units. Using switch units of dimension m×m each, m>1, the dimension M of a switch having S cascaded stages is determined as: $M=m^{(S+1)/2}$. For example, with m=32 and S=3, M=1024 and with S=5, M=32768.

Core Switch

A core switch of the present invention comprises a switch fabric and a balanced-connector. The balanced-connector may connect incoming channels to the input side of the switch fabric where any incoming channel may access multiple inlet ports of the switch fabric during non-overlapping time intervals. Alternatively, the balanced-connector may connect the output side of the switch fabric to outgoing channels so that each outgoing channel may access several outlet ports of the switching fabric during non-overlapping time intervals.

FIG. 1 illustrates an exemplary core switch 100 comprising switch units 120A, 120B, 120C, 120D, 120E, 120F, 120G, and 120H, referenced individually or collectively as 120. The switch units 120 are interconnected in a full-mesh structure through internal links 122, with each internal link 122 comprising at least one channel. A switch unit 120 may include an electronic switch fabric, an optical switch fabric, or a hybrid electronic-optical switch fabric. Several source nodes 112 may connect to a switch unit 120 through outbound channels 116 (that is, outbound from the source nodes 112 and incoming to the core switch 100) and several sink nodes 114 may connect to a switch unit 120 through inbound channels 118 (that is, inbound to the sink nodes 114 and outgoing from the core switch 100). A source node 112 may be integrated with a sink node 114, where the integrated source and sink node pair may share memory and processors. A source node 112 receives signals from subtending sources (not shown), processes the signals, and transmits the processed signals to a sink node 114 either directly or through the core switch 100. A sink node 114 transmits signals, received directly or through the core switch 100, from a source node 112 to subtending sinks (not shown). It is customary to refer to signals from sources to sinks as traffic which may be characterized by several parameters, the most basic of which is the flow rate or traffic intensity. The term flow rate, as used herein, is specific to each directed node pair, where a directed node pair comprises a source node 112 and a sink node 114. More specifically, the traffic from source nodes 112 to sink nodes 114 is referenced as outer traffic while the traffic between switch units 120 is referenced as inner traffic.

A connection between a source node 112 and its integrated sink node 114 is established directly. That is, traffic from a source node 112 and an integrated sink node 114 does not pass through the core switch 100. Traffic between a source node 112 and a sink node 114 connecting to a common switch unit 120 traverses only the common switch unit 120. For example, traffic from source node 112-1 to sink node 114-1 traverses only one switch unit (i.e., 120D). Traffic between a source node 112 and a sink node 114, where the source node and sink node connect to different switch units 120, traverses at least two switch units 120. For example, traffic from source node 112-0 to sink node 114-1 traverses at least switch units: 120A and switch unit 120D.

Outer Traffic Imbalance

Figure 2:
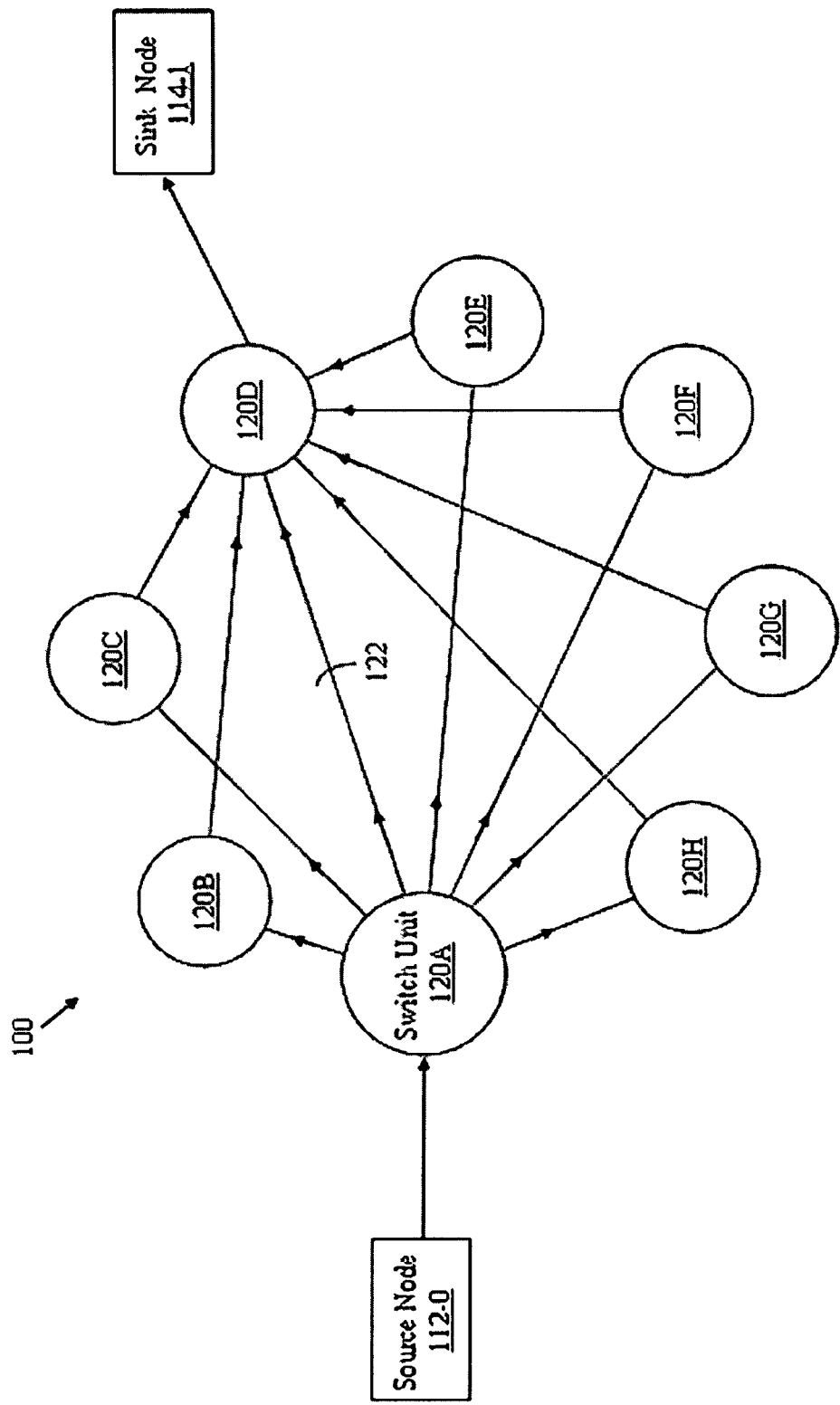
FIG. 2 illustrates direct paths and two-link paths in the prior-art core switch of FIG. 1.

If the spatial distribution of outer traffic (from source nodes 112 to sink nodes 114) is perfectly balanced, i.e., if the flow is time-invariant and the flow rate from each source node 112 to any sink node 114 is equal to the flow rate from said each source node to each other sink node 114, then traffic from any source node 112 connecting to a first switch unit 120 to any sink node 114 connecting to a second switch unit 120 need only traverse the first switch unit and the second switch unit. In practice, the spatial distribution of the outer traffic is not generally balanced and may change violently with time. This imbalance may force a significant proportion of traffic from a source node connecting to a first switch unit 120 to a sink node connecting to a second switch unit 120 to use at least one alternate path from the first switch unit to the second switch unit where each alternate path traverses an intermediate switch unit 120 other than the first and second switch units as illustrated in FIG. 2. For example, in an extreme case, if all the traffic from source nodes 112 subtending to switch unit 120A is directed to sink nodes subtending to switch unit 120D during a given period of time, then the combined flow rates may overwhelm the capacity of the direct link 122 connecting switch unit 120A to switch unit 120D. The traffic received from subtending sources at switch unit 120A may then be directed through some or all of the two-link paths {120A-120B-120D}, {120A-120C-120D}, {120A-120E-120D}, {120A-120F-120D}, {120A-120G-120D}, and {120A-120H-120D}. The implication of using two-link paths is twofold: firstly, an internal capacity expansion would be needed to compensate for the use of two links per connection and, secondly, the computational effort for connection setup is increased. In particular, if the switch units 120 employ bufferless switch fabrics, for example photonic switch fabrics, then the connection setup process for each two-link path would require a complex third-order temporal matching process as described in United States Patent Publication No. 2004/0037558 entitled "Modular High Capacity Switch." Internal capacity expansion is realized by dividing the (dual) ports of a switch unit 120 unequally into a number of outer ports (inlet ports and outlet ports), connecting to source nodes 112 and sink nodes 114, and a larger number of inner ports (inward ports and outward ports) connecting to other switch units 120. For example, if the number of (dual) ports per switch unit 120 is 32, then the number of outer ports may be selected to be 12 and the number of inner ports would be 20. The total number of switch units 120 in the mesh structure would then be 21 (that is, each switch unit 120 would be connected to 20 other switch units 120 via its 20 inner ports) and the total number of outer ports would be 12×21=252. The outer ports, which connect to the source nodes 112 and sink nodes 114, define the capacity of the core switch 100. In a hypothetical case where the outer traffic is time-invariant and perfectly spatially balanced, the 32 ports of a switch unit 120 may be divided equally into 16 outer ports and 16 inner ports. The number of switch units 120 in the mesh structure would then be 17 (that is, each switch unit 120 would be connected to 16 other switch units via its 16 inner ports) and the total number of outer ports would be 16×17=272. Thus, fewer switch units (17 instead of 21) would be used to produce a higher capacity switch (272 versus 252 outer ports). More importantly, the control function of the core node 100 would be greatly simplified in the higher capacity switch.

Induced Balanced Inner Traffic

Figure 3:
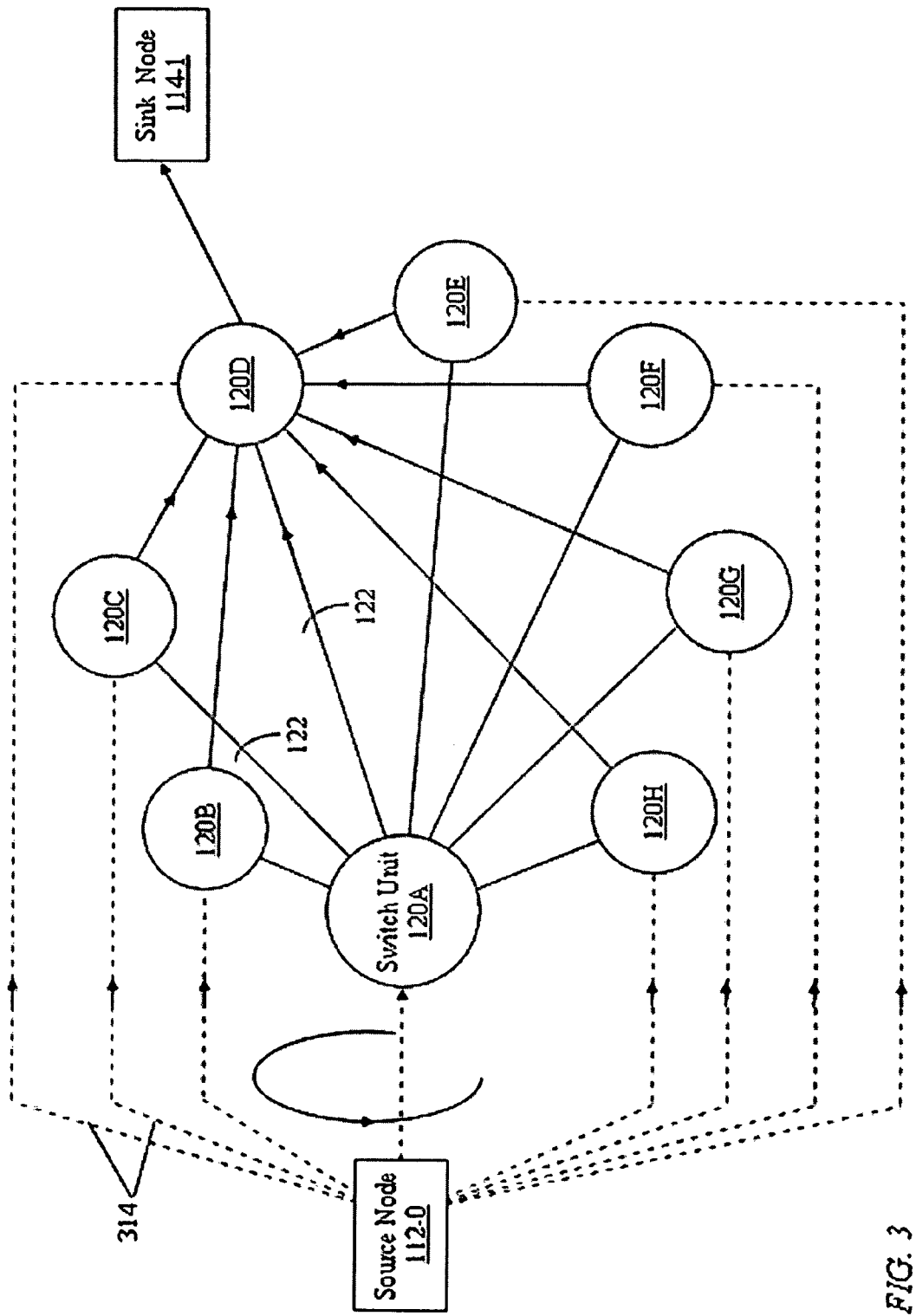
FIG. 3 illustrates a generic rotating-access scheme of incoming channels to the switch units of the switch of FIG. 1 devised to avoid the use of two-link paths in accordance with an embodiment of the present invention.

Naturally, an imbalance of outer traffic leads to inner-traffic imbalance and, hence, the need for using two-link paths. To avoid the use of two-link paths, balanced inner traffic may be induced, in accordance with the present invention, by letting each source node 112 cyclically access each switch unit 120 through time-multiplexed channels 314 as illustrated in FIG. 3. That is, the cyclic-access pattern is devised such that each source node 112 accesses each switch unit 120 exactly once during each access cycle. In this manner, each outer traffic flow, defined by a source node 112 and a target sink node 114, would be equally divided among links 122 leading to a switch node 120 supporting the target sink node. Because a switch unit 120 may support numerous source nodes 112, the cyclic-access pattern is additionally devised to ensure that source nodes 112 that access a switch unit 120 during any time interval of an access cycle individually access different switch units 120 during each other time interval of the access cycle.

Figure 4:
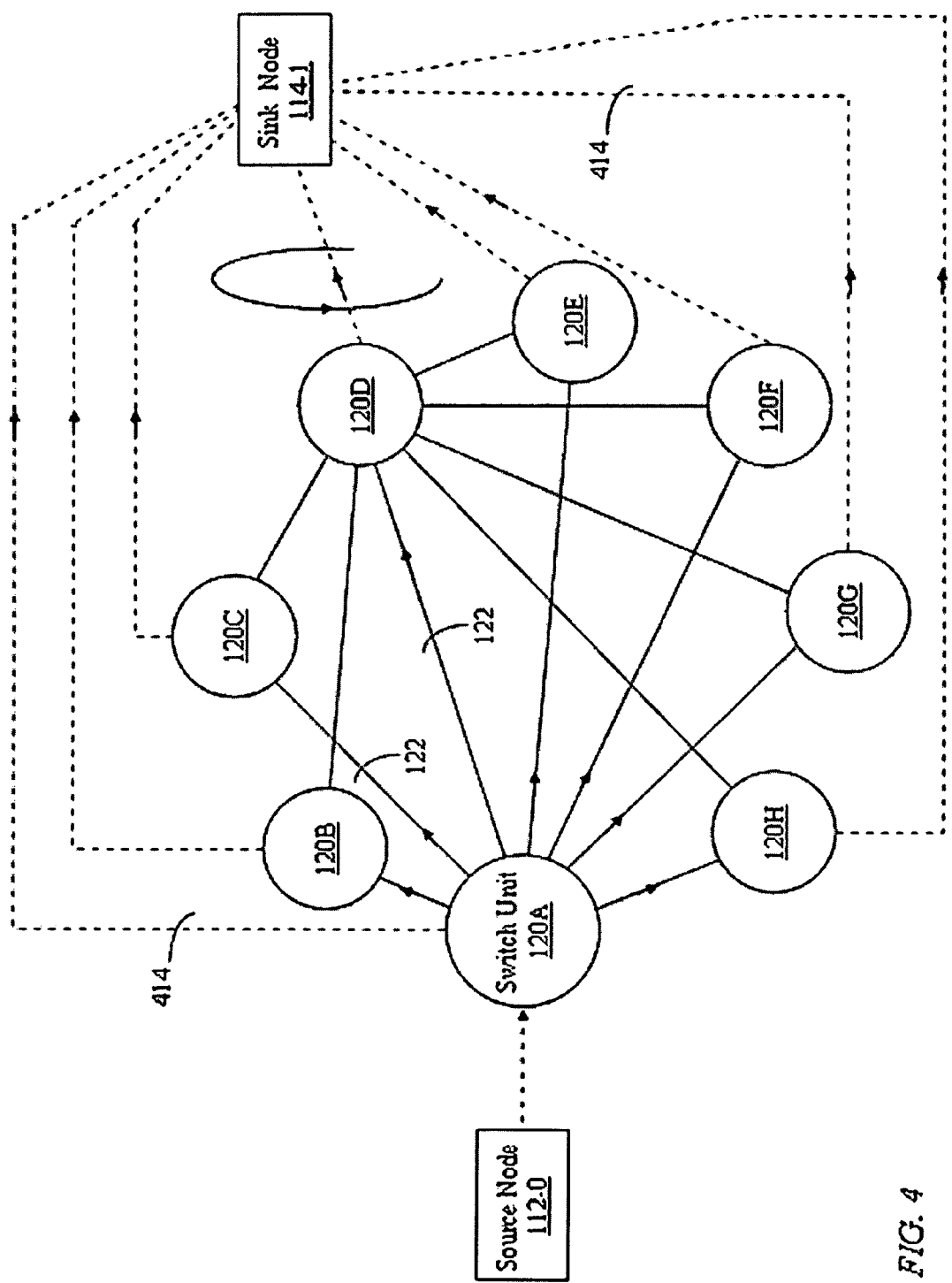
FIG. 4 illustrates a generic rotating-access scheme of outgoing channels to the switch units of the switch of FIG. 1 devised to avoid the use of two-link paths in accordance with an embodiment of the present invention.

Alternatively, the use of two-link paths may be avoided by letting each sink node 114 cyclically access each switch unit 120 as illustrated in FIG. 4. That is, the cyclic-access pattern is devised such that each sink node 114 accesses each switch unit 120 exactly once during each access cycle. In this manner, each outer traffic flow, defined by a source node 112 and a target sink node 114, would be scheduled to equitably use time-multiplexed channels 414 leading to the target sink node. Because a switch unit 120 may support numerous sink nodes 114, the cyclic-access pattern is additionally devised to ensure that sink nodes 114 that access a switch unit 120 during any time interval of an access cycle individually access different switch units 120 during each other time interval of the access cycle.

Modular Balanced-Connector

Figure 5:
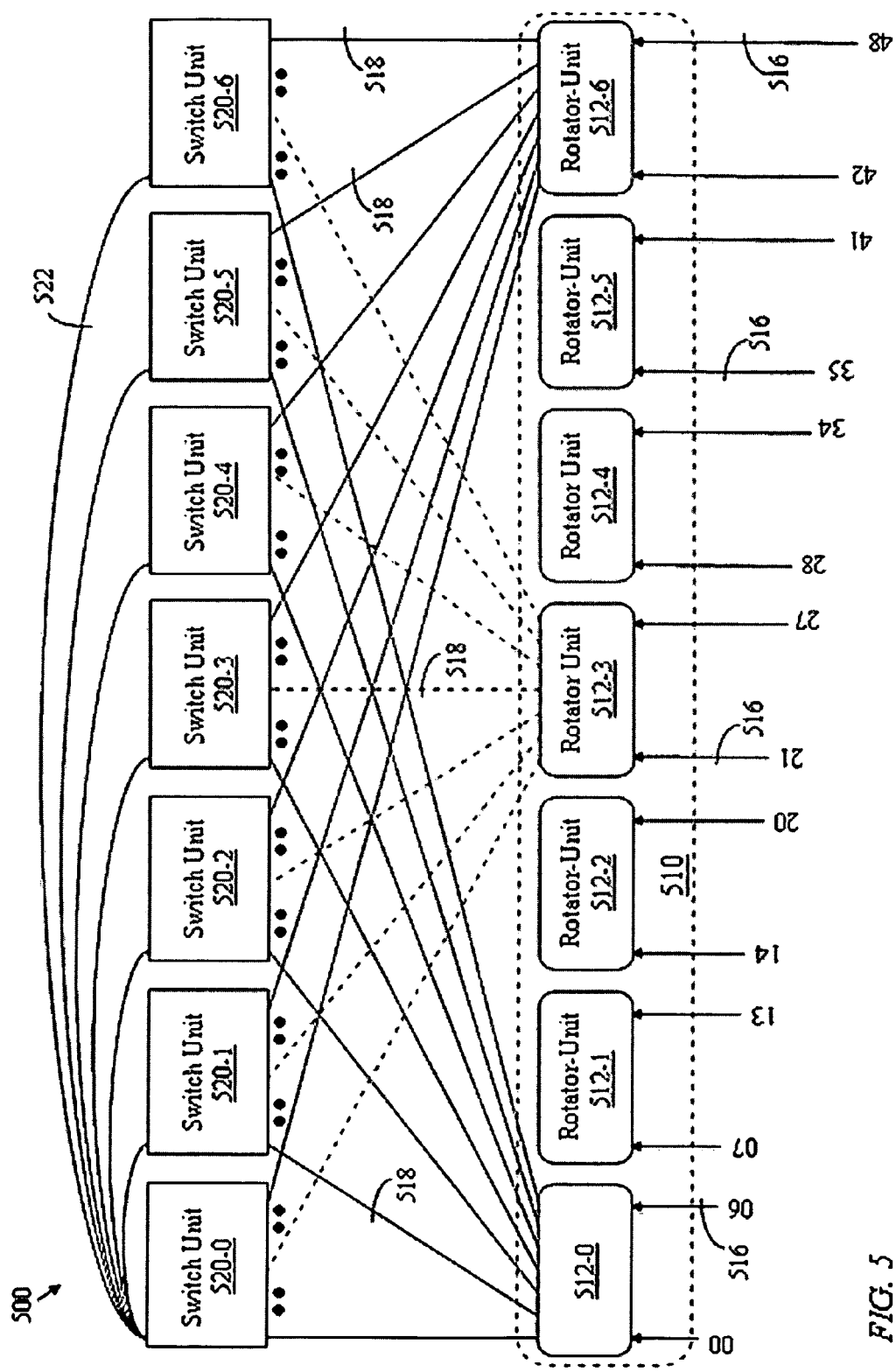
FIG. 5 illustrates a switch comprising switch units and a modular balanced-connector comprising a plurality of rotator units having different cyclic-connectivity patterns in accordance with an embodiment of the present invention.

FIG. 5 illustrates a switch 500 comprising seven switch units 520-0, 520-1, 520-2, 520-3, 520-4, 520-5, and 520-6 (referenced individually or collectively as 520) and a balanced-connector 510 comprising seven rotator units 512-0, 512-1, 512-2, 512-3, 512-4, 512-5, and 512-6 (referenced individually or collectively as 512). Each rotator unit has seven input ports with each input port connected to one of seven incoming channels 516. For example, rotator unit 512-0 has seven incoming channels labeled 516-00 to 516-06 and rotator unit 512-3 has seven incoming channels labeled 516-21 to 516-27. Each rotator unit 512 is characterized by a rotation step. A rotation step of a rotator unit 512 determines the successive output ports of the rotator unit 512 to which an input port of the same rotator unit 512 connects during successive time intervals. Rotator unit 512-0 has a rotation step of zero and, hence, it is a static connector. In a static connector, each input port is always connected to the same output port. The rotator units 512 may be identified by an index j, and the index j may also be used as an indication of the rotation step. Each incoming channel 516 at an input of a rotator unit 512 may cyclically connect to output ports of the rotator unit 512 according to a cyclic order determined by the rotation step. The output ports of a rotator unit 512 connect to inlet ports of different switch units so that each switch unit 520 receives a channel 518 from each rotator unit 512. Channels 518 from only rotator units 512-0, 512-3, and 512-6 are shown. The seven switch units 520-0 to 520-6 are interconnected by channels 522 to form a full mesh structure. Channels 522 from only one switch unit, 520-0, to the remaining switch units are shown. The number of rotator units 512 preferably does not exceed the number of time intervals per time frame. A preferred cyclic order according to the present invention is determined as described below. The incoming channels of rotator unit 512-0 are labeled 516-00 to 516-06, the incoming channels of rotator unit 512-1 are labeled 516-07 to 516-13, and so on. For the sake of clarity of the figure, the incoming channels are simply indicated as 00 to 06 for rotator unit 512-0, 07 to 13 for rotator unit 512-1, 14 to 20 for rotator unit 512-2, 21 to 27 for rotator unit 512-3, 28 to 34 for rotator unit 512-4, 35 to 41 for rotator unit 512-5, and 42 to 48 for rotator unit 512-6. As will be illustrated in FIG. 9 below, the balanced-connector 510, cyclically connects the 49 incoming channels, labeled 00 to 48, to the switch units 520-0, 520-1, ..., 520-6 so that the seven incoming-channels to any switch unit 520 during any time interval would individually connect to different switch units 520 during any other time interval.

Define $\lambda$ as the number of input ports (the number of incoming channels) per rotator unit 512, $\Delta_j$ as the rotation step of a rotator unit of index j, $\phi_j$ as an arbitrary initial offset of rotator unit j, $P_j$ a relative index of an input port of a rotator unit, and $\pi$ as an identifier of a time interval of the rotation time frame, such that:

$$0 \le v < \lambda,\ 0 \le P_j < \lambda,\ 0 \le j < \lambda,\ 0 \le \phi_j < \lambda,\ \text{and } 0 \le \Delta_j < \lambda$$

If $\lambda$ is a prime number, the output port $Q_j(\tau)$ of rotator unit j to which input port $P_j$ of the same rotator unit connects during time interval $\tau$ is determined as:

$$Q_j(\tau) = [P_j + \phi_j + \tau \times \Delta_j]_{modulo\ \lambda}.$$

If $\lambda$ is not a prime number, the output port $Q_j(\tau)$ of rotator unit j to which input port $P_j$ of the same rotator unit connects during time interval $\tau$ is determined as follows:

Define $$\Omega = \min(\Delta_j, \lambda - \Delta_j),\ \text{and}$$

$$\eta = \begin{cases} \lambda/\Omega & \text{if } \Omega \ne 0 \text{ and } \mathrm{mod}(\lambda, \Omega) = 0 \\ \lambda & \text{Otherwise} \end{cases}$$

then $$Q_j(\tau) = [P_j + \phi_j + \tau \times \Delta_j + \lfloor \tau/\eta \rfloor]_{modulo\ \lambda}.$$

where $\lfloor x \rfloor$ of any real number x denotes the integer part of x, and $[K]_{modulo\ \lambda}$ is the standard notation of the remainder of an integer K divided by a non-zero integer $\lambda$. It is noted that if $\lambda$ is a prime number then $\mathrm{mod}(\lambda, Q) \ne 0$ for $\Omega > 1$, hence: $\eta = \lambda$ and $\lfloor \xi/\eta \rfloor_{modulo\ \lambda} = 0$.

The above expression for $Q_j(\tau)$ determines the sequence of output ports to which a specific input port of the same rotator unit cyclically connects during a time frame of $\lambda$ time intervals $\tau$. Inversely, the sequence of input ports, denoted $\Pi_j(\tau)$, of a rotator unit 512-j, which connect to a specific output port, denoted $\Theta_j$, of the same rotator unit j may be determined from:

$$\Pi_j(\tau) = [\Theta_j - \phi_j - \tau \times \Delta_j]_{modulo\ \lambda},$$

if $\lambda$ is a prime number. If $\lambda$ is not a prime number, the sequence of input ports $\lceil_j(\tau)$ which connect to the specific output port $\Theta_j$ during a time frame may be determined from:

$$\Pi_j(\tau) = [\Theta_j - \phi_j - \tau \times \Delta_j - \lfloor \tau/\eta \rfloor]_{modulo\ \lambda}.$$

The expression for $\Pi_j(\tau)$ is used to generate the connectivity pattern of FIG. 9.

Figure 6:
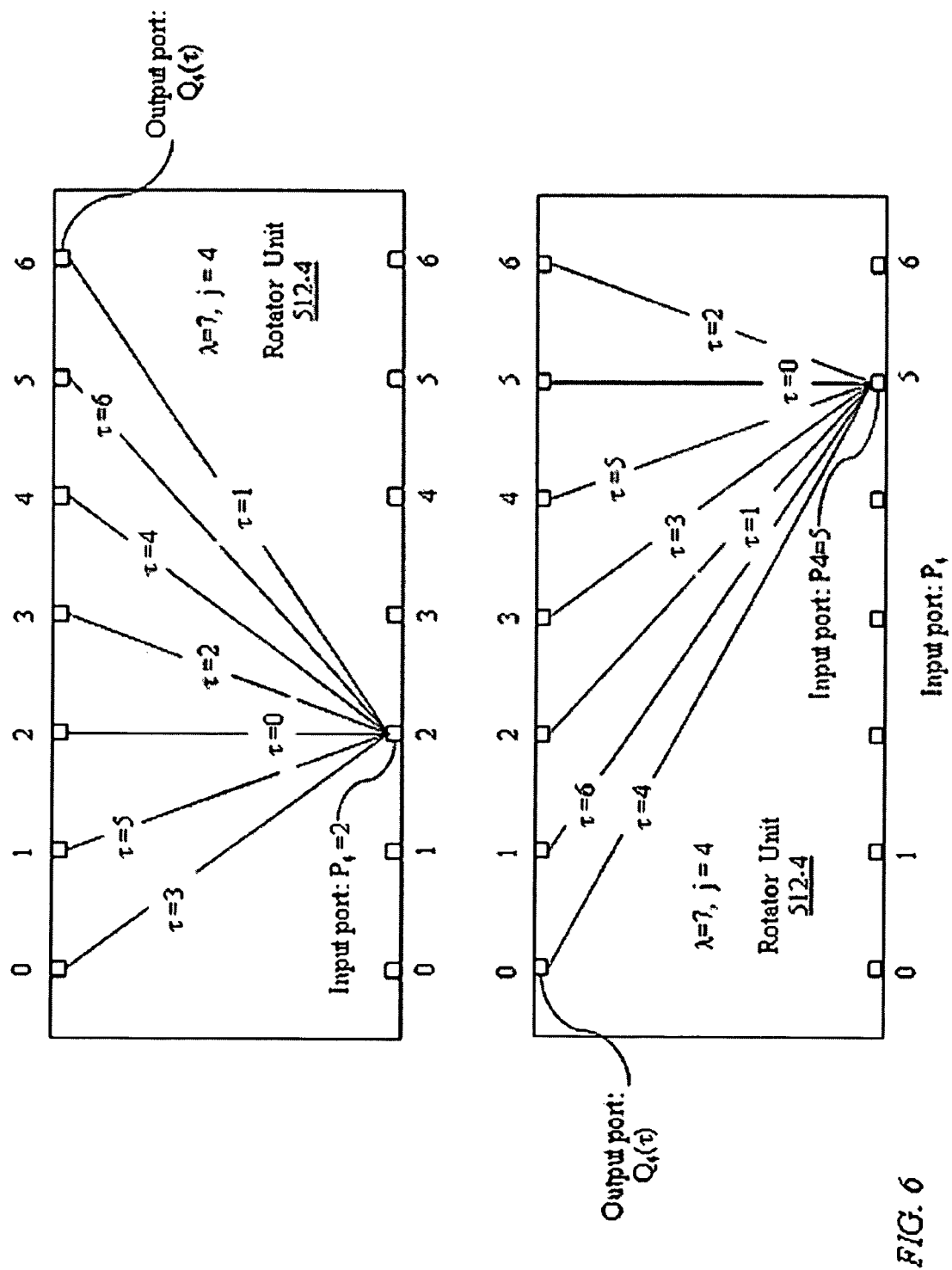
FIG. 6 illustrates connectivity of selected input ports of an exemplary rotator unit, the rotator unit having a prime number of dual ports, of a modular balanced-connector in the switch of FIG. 5 during successive time intervals in accordance with an embodiment of the present invention.
Figure 7:
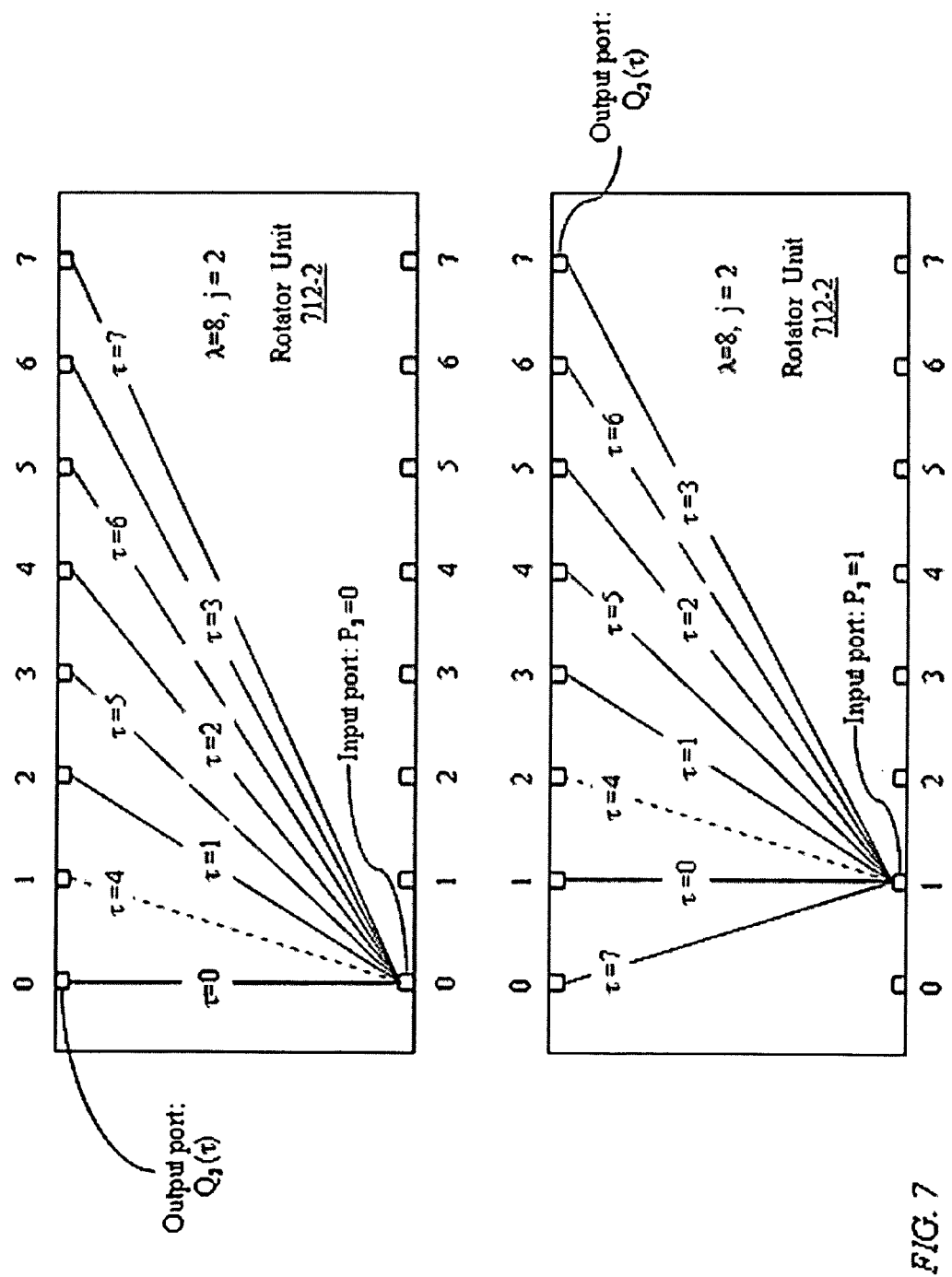
FIG. 7 illustrates connectivity of selected input ports of an exemplary rotator unit, having a non-prime number of dual ports, of a modular balanced-connector during successive time intervals in accordance with an embodiment of the present invention.
Figure 8:
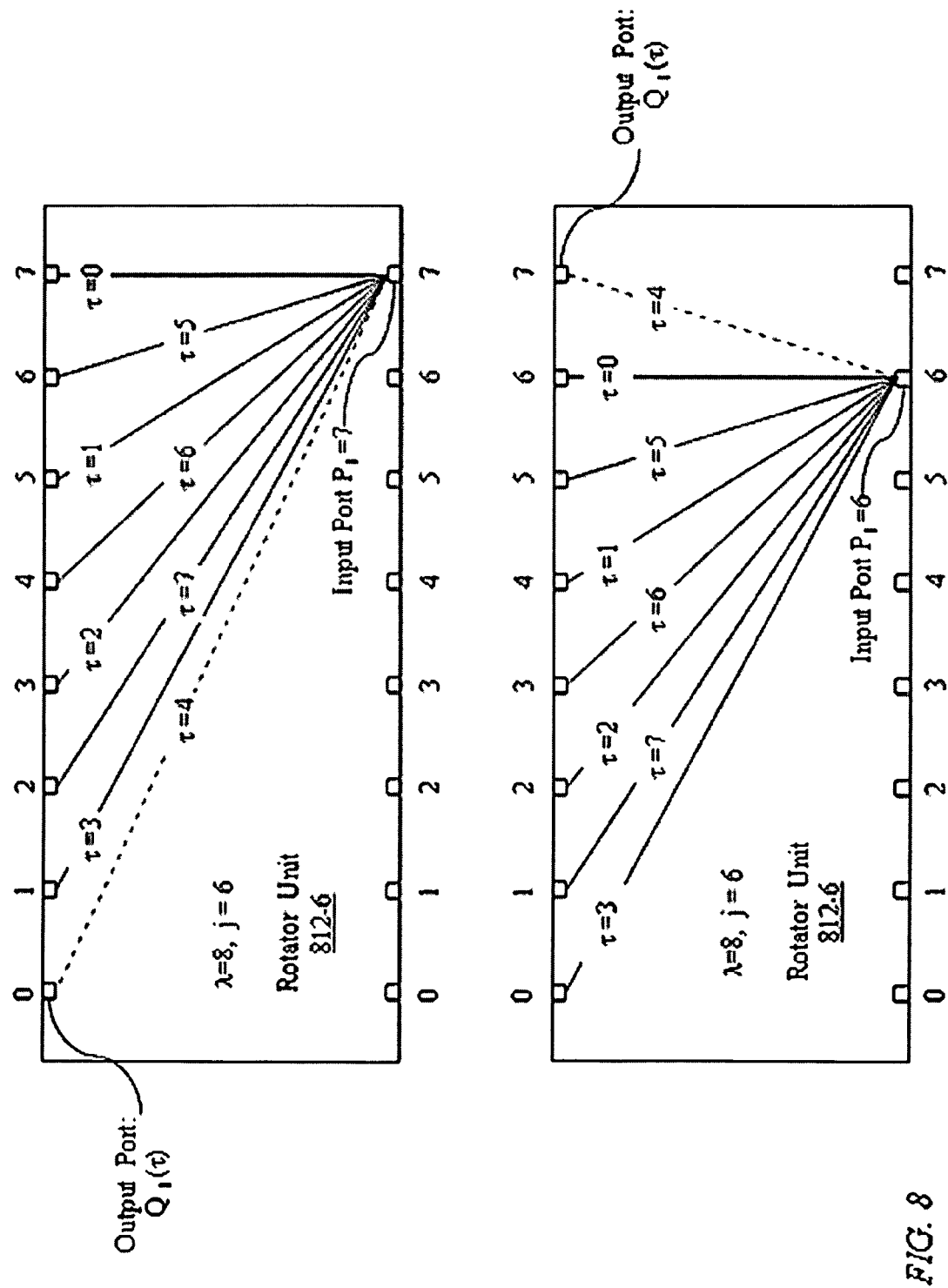
FIG. 8 illustrates further connectivity patterns of the exemplary rotator unit of FIG. 7.

FIG. 6 illustrates the cyclical connectivity for input ports $P_4=2$ and $P_4=6$ during time intervals $\tau=0$ to $\tau=6$ of a rotator unit having $\lambda=7$ (seven input ports and seven output ports). The rotator unit is characterized by a rotation step of four (index j=4, $\Delta_4=4$) and zero rotation shift ($\phi_4=0$). FIG. 7 illustrates the cyclical connectivity for time intervals $\tau=0$ to $\tau=7$ of a rotator unit 712-2 having eight input ports and eight output ports ($\lambda=8$) characterized by a rotation step of two (index j=2, $\Delta_2=2$) and a rotation offset of zero ($\phi_2=0$) for input ports $P_2=0$ and $P_2=1$. FIG. 8 illustrates the cyclical connectivity for time intervals $\tau=0$ to $\tau=7$ for input ports $P_6=6$ and $P_6=7$ of a rotator unit 812-6 having eight input ports and eight output ports ($\lambda=8$) with a rotation step of six (j=6, $\Delta_6=6$).

FIG. 6 illustrates the sequence of output ports, of a specific rotator unit, 512-4, of switch 500 to which an input port of the same rotator unit connects during successive time intervals of a time frame having seven time intervals. The input ports of the rotator unit are indexed as 0 to 6 and the output ports of the rotator unit are likewise indexed as 0 to 6. An input port of any rotator unit 512-j in switch 500 of FIG. 5 may be identified by the index j of the rotator unit and the index of the input port within the rotator unit. A switch unit 520-k in switch 500 receives a channel 518 from each rotator unit 512. It is convenient, without loss of generality, to let the output port of index k of each rotator unit 512 to connect to an inlet port of switch unit 520-k. The sequence of output ports $Q_j(\tau)$ of a rotator unit 512-j having a rotation step $\Delta_j$ is governed by the respective expression for $Q_j(\tau)$ given above. The sequence of input ports $\Pi_j(\tau)$ connecting to a specific output port $\Theta_j$ of rotator unit 512-j is determined by the respective expression for $\Pi_j(\tau)$ given above. The subsets of 49 incoming channels 516-0, 516-1, ..., 516-48, labeled as 0 to 48 for brevity, connecting to each switch unit 520 during each time interval $\tau=0$ to $\tau=6$ of a repetitive time frame of seven time intervals may then be determined as depicted in FIG. 9. FIG. 9 illustrates the subsets, each of seven incoming channels, that connect through the balanced-connector 510 to each switch unit, 520-0 to 520-6, during each of the seven time intervals $\tau=0$ to $\tau=6$. Any two of the 49 combinations of incoming channels mutually intersect in only one incoming channel. This property results in balancing the inner traffic load offered to the meshed switch units, eliminating the need for two-link paths that each require a third-order time-slot-matching process each.

Figure 10:
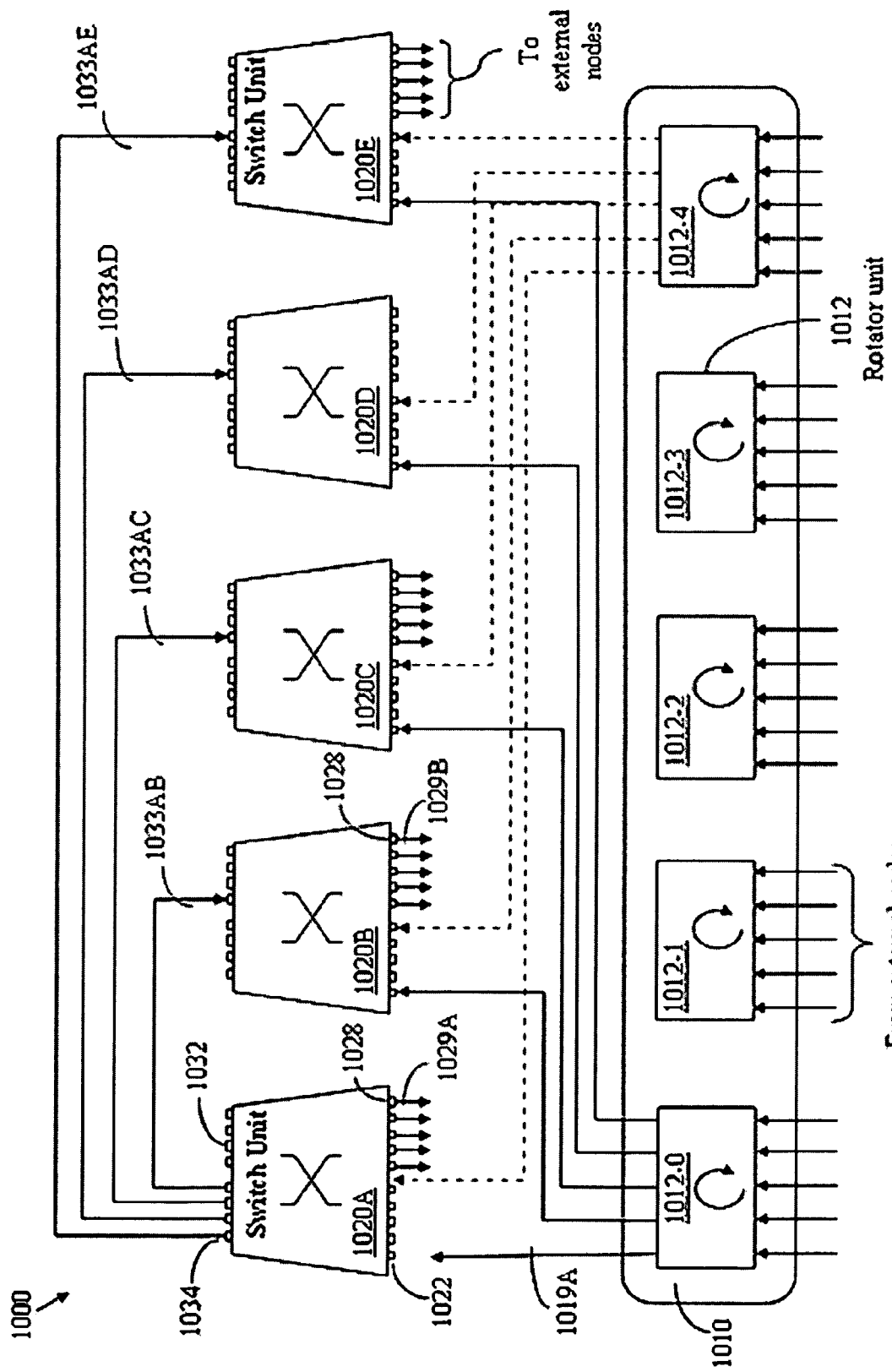
FIG. 10 illustrates a switch, in accordance with the present invention, comprising an interconnection configuration of switch units to form a mesh structure.

FIG. 10 illustrates a balanced bufferless switch 1000 comprising switch units 1020 (1020A, 1020B, 1020C, etc.) interconnected in a mesh structure and preceded by a balanced-connector 1010. Balanced-connectors useful in balanced bufferless switches of the present invention are described in the U.S. patent application Ser. No. 11/010,742 filed on Dec. 8, 2004 and titled "Balanced Bufferless Switches." The balanced-connector 1010 is implemented as an array of rotator units 1012 having graduated rotation steps. When describing a generic switch unit herein, the switch unit will be referred to as switch unit 1020. When referring to a specific switch unit herein, the switch unit will be referred to as switch unit 1020A, 1020B, etc. The input ports of each switch unit 1020 are functionally divided into a plurality of inlet ports 1022 receiving signals through channels 1019 from rotator units 1012 and a plurality of inward ports 1032 receiving signals from other switch units 1020 through channels 1033. For example, switch unit 1020C receives signals from switch unit 1020A through channel 1033AC. The output ports of a switch unit 1020 are functionally divided into a plurality of outlet ports 1028 transmitting signals to external nodes (that is, sink nodes—not shown) through channels 1029 and a plurality of outward ports 1034 transmitting signals to inward ports 1032 of other switch units 1020 through channels 1033. The mesh structure in the balanced bufferless switch 1000 has the advantage of enabling internal connections within each switch unit 1020 as well as direct connections between switch units 1020, thus helping to reduce the traffic load offered to the inner links between switch units 1020. In the full-mesh structure of the balanced, bufferless switch 1000, a path from an inlet port 1022 of a first switch unit 1020 to an outlet port 1028 of the same switch unit 1020 may be established within the first switch unit 1020. A path from an inlet port 1022 of a first switch unit 1020 to an outlet port 1028 of a second switch 1020 unit may traverse a direct channel 1033 connecting the first switch unit 1020 to the second switch unit 1020 or may be an indirect path through any switch unit 1020 other than the first and second switch units 1020.

Figure 11:
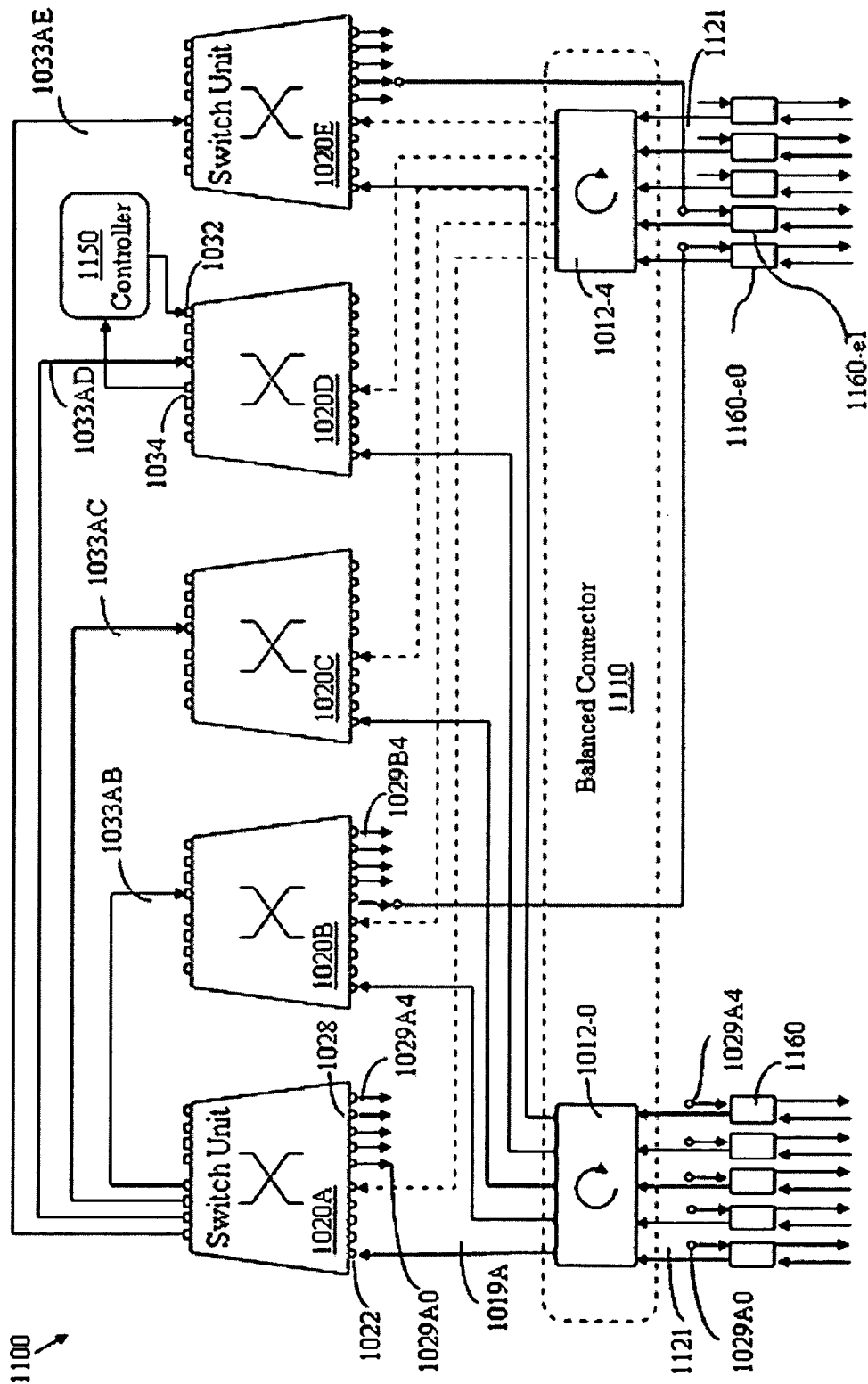
FIG. 11 illustrates an embodiment of the present invention comprising the switch of FIG. 10, a core controller, and edge nodes.

FIG. 11 illustrates a switching system 1100 comprising the balanced, bufferless switch 1000 of FIG. 10 and edge nodes 1160 arranged in groups of five edge nodes each, each group connected to send traffic to a rotator unit 1012 and connected to receive traffic from a switch unit 1020. A switch controller 1150 is connected between an outward port 1034 of a switch unit 1020D and an inward port 1032 of the same switch unit 1020D. As described earlier, a switch unit 1020 connects to external nodes through inlet ports 1022 and outlet ports 1028 and connects to other switch units 1020 through outward ports 1034 and inward ports 1032. Controller 1150 receives control signals from edge nodes 1160 during staggered time intervals and communicates control signals to the edge nodes 1160 during staggered time intervals. Control signals are switched in the switch unit 1020D to and from the controller 1150. Edge nodes 1160 have asymmetrical connections to the switch 1000. The source nodes and sink nodes are not illustrated separately in FIG. 11. The source node of each edge node 1160 has an outbound channel 1121 to an input port of a rotator unit 1012 and the sink node of each edge node 1160 has an inbound channel 1029 from an outlet port 1028 of a switch unit 1020. Thus, a source node of an edge node 1160 may transmit to all switch units 1020 while a sink node of an edge node 1160 may receive from only one switch unit 1020.

A rotation cycle of the balanced-connector includes a predetermined number of time-intervals. A time frame, corresponding to a complete rotation cycle, is defined by a predetermined number of rotation time intervals. Each rotation time interval may be divided into a number $v \geq 1$ of time slots to realize fine switching granularity. The number of time slots per time frame is therefore an integer multiple of the number of time intervals of a rotation cycle. It is noted here that the balanced-connector 1110 changes its connectivity pattern every time interval while a switch unit 1020 may change its connectivity pattern every time slot. Herein, the time frame is selected to correspond to one rotation cycle.

The switch 1000 thus realized has two main advantages. Firstly, it reduces the required switch-unit capacity for the same overall throughput of the entire modular switch because of a reduced requirement for internal expansion. Secondly, it reduces the processing effort by significantly reducing or eliminating the need for processing-intensive third-order matching. Determining a path through two stages requires only a second-order matching process.

An internal expansion, where the inner capacity of a switch unit exceeds its outer capacity, is required in a conventional mesh structure (FIG. 1) for two main reasons. The first is to compensate for the capacity consumption of paths traversing more than one inner link. The second is to offset the effect of internal blocking caused by misalignment of vacant time slots. Preferably, in the balanced, bufferless switch 1000, only intra-switch-unit paths and direct inter-switch-unit paths may be used. The need for indirect paths (i.e., paths traversing three switch units) is significantly reduced by using the balanced-connector 1110 and may be almost entirely avoided by providing a relatively small expansion.

Time-Space Rotator Connectivity Mapping

Figure 12:
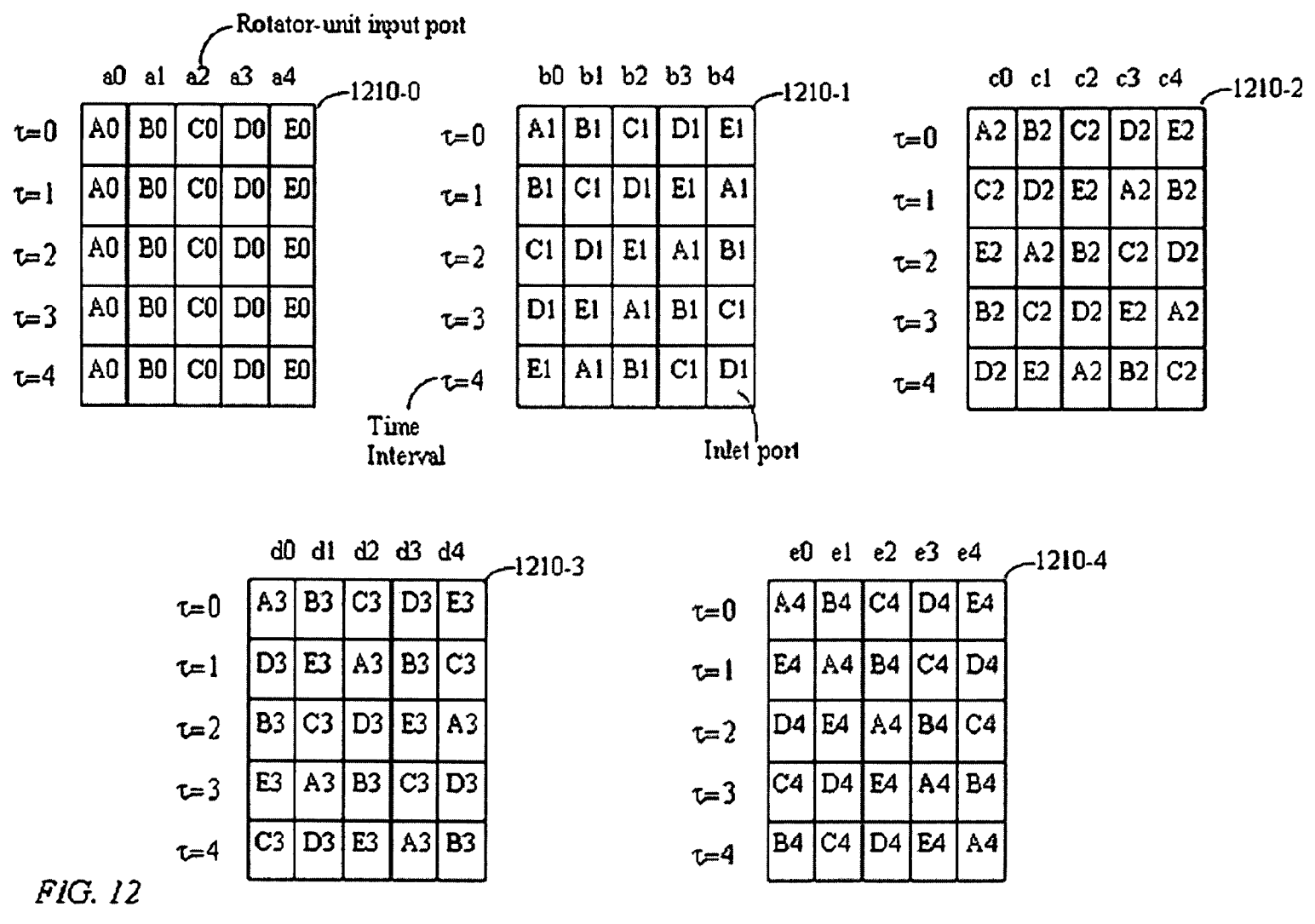

During a time interval in a time frame, each input port of each rotator unit 1012 connects to a corresponding inlet port 1022 of a switch unit 1020. That is, each rotator unit 1012 receives traffic at an input port from an edge node 1160 through a channel 1121 and each rotator unit 1012 sends traffic to an inlet port 1022 of a switch unit 1020 through a channel 1019. During successive time slots within a time interval, a switch unit 1020 may connect to other switch units 1020. In order to facilitate connection scheduling, a time-space map, such as the one illustrated in FIG. 12, may be used. A time-space map may be encoded (programmed) for use by a scheduler to determine the inlet port 1022 of a switch unit 1020 to which an input port of a rotator unit 1012 is connected during each time-interval in a time frame. FIG. 12 illustrates connectivity matrices 1210-0 to 1210-4 for a set of five rotator units 1012, each rotator unit 1012 having five input ports and five output ports. All the rotator units 1012, including the static rotator unit 1012-0, connect to switch units 1020 in the configuration of FIG. 12. For illustration purposes, switch units 1020A, 1020B, 1020C, 1020D, and 1020E are respectively referenced as 'A', 'B', 'C', 'D', and 'E' in FIG. 12. Likewise, rotator units 1012-0, 1012-1, 1012-2, 1012-3, and 1012-4 are respectively referenced as '0', '1' (not shown), '2' (not shown), '3' (not shown), and '4'. Input ports of rotator unit 1012-0 are referenced in the matrices 1210 as a0 to a4, input ports of rotator unit '1' (not shown) are referenced as b0 to b4, and so on. The inlet ports of switch unit 1020A are referenced in the matrices 1210 as A0 to A4, inlet ports of switch unit 1020B are referenced as B0 to B4, and so on. Rotator-unit 1012-$j$, $0 \leq j < J$, has a rotation step of j, where j varies between 0 and 4 (J=5 in this example). That is, J is the total number of rotator units 1012 and is also the number of output ports per rotator unit 1012. Rotator unit 1012-0, having a zero rotation step, is a static connector—its input-output connectivity does not change with time. A rotator unit of zero rotation step is still referenced as a rotator unit 1012 for uniformity. Each column in a matrix 1210-$j$ corresponds to an input port p of a rotator-unit 1012-$j$ and each row $\tau$ in matrix 1210-$j$ corresponds to a rotation time interval $\tau$ in a rotation cycle. Each entry corresponding to a row $\tau$ and column p in a matrix 1210-$j$ contains an identifier of an inlet port $\pi$ of a switch unit 1020 to which an input port p of rotator 1012-*j* connects at time interval τ, for 0≤τ<J and 0≤j<J. For example, input port p=b2 in connectivity matrix 1210-1 connects to: inlet port C1 of switch unit C during rotation time interval τ=0; inlet port D1 of switch unit D during rotation time interval τ=1; followed by inlet ports E1, A1, and B1 of switch units E, A, and B, respectively, during time intervals τ=2, τ=3, and τ=4.

Without loss of generality, each input port p of a rotator unit r may connect to inlet port π=r of a switch unit 1020 that is indicated in an entry {p, τ} in a matrix 1210-*r*. Thus, in FIG. 12, each input port of rotator unit 1012-1 connects to inlet ports π=1 of switch unit A (that is, A1), π=1 of switch unit B (that is, B1), τ=1 of switch unit C (that is, C1), π=1 of switch unit D (that is, D1), and π=1 of switch unit E (that is, E1) during each time frame. Similarly, each input port of rotator unit 1012-4 connects to inlet ports π=4 of switch unit A (that is, A4), π=4 of switch unit B (that is, B4), π=4 of switch unit C (that is, C4), π=4 of switch unit D (that is, D4), and π=4 of switch unit E (that is, E4) during each time frame. This order may be altered if so desired.

Figure 13:
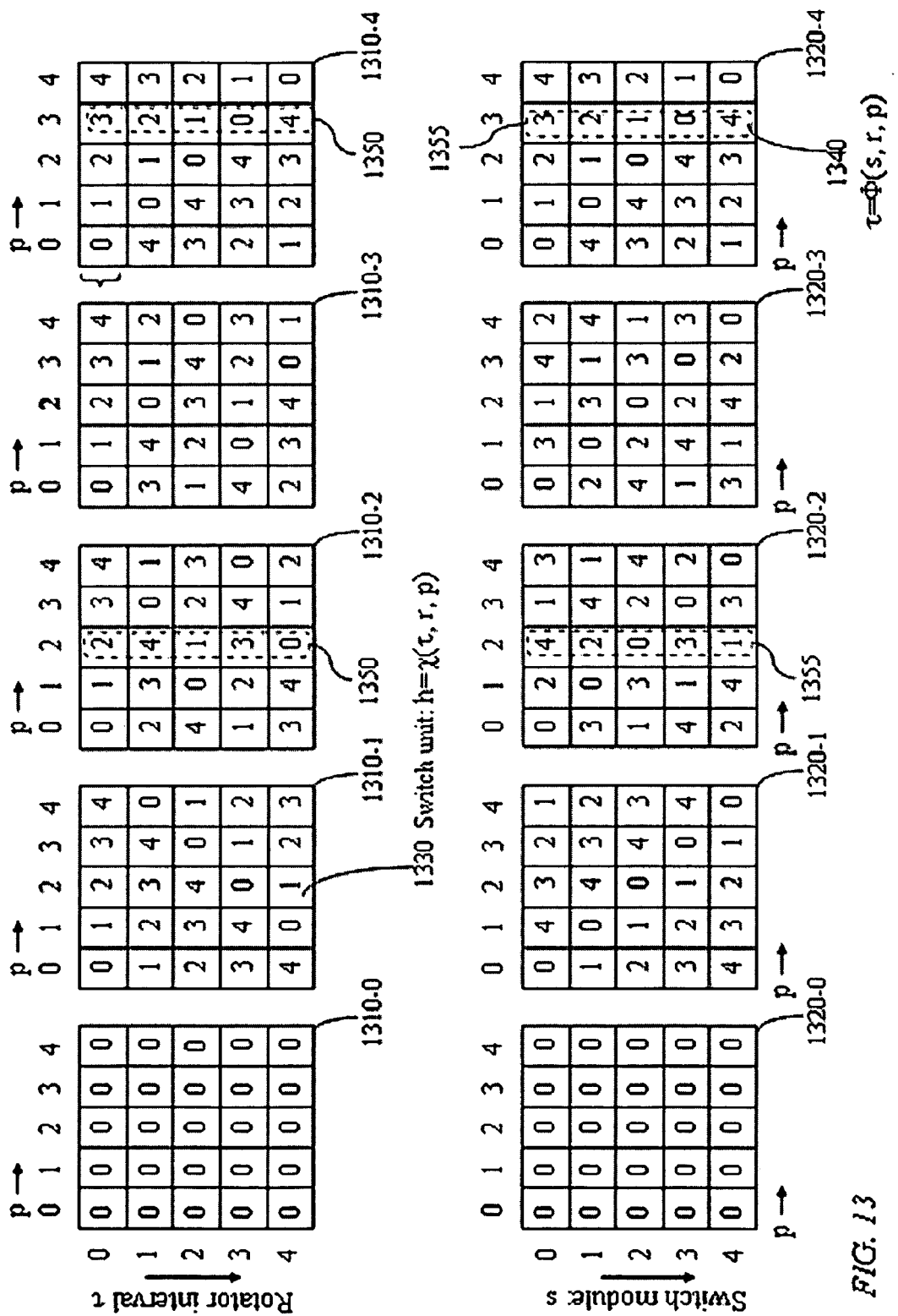
FIG. 13 illustrates a first set of matrices, one for each rotator unit, used for determining the switch unit to which an input port of a rotator unit of a balanced-connector connects during a rotation time interval, and a second set of matrices, one for each rotator unit, used for determining a rotation time interval during which an input port of a rotator unit connects to a switch unit, for use with an embodiment of the present invention.

To facilitate the computation of internal routes within switch 1000, matrices 1210-0 to 1210-4 are rewritten, as illustrated in FIG. 13, as matrices 1310, respectively, replacing symbols A, B, C, D, and E with numbers 0 to 4 respectively. Each entry in a matrix 1310 is an identifier of a switch unit 1020. A column 1350 corresponding to an input port p of a rotator unit r in a matrix 1310-*r* includes identifiers of switch units 1020 accessed by input port p during successive time intervals of the cyclic time frame. An identifier of a relative inlet port number π (i.e., 1022-π) for each switch unit 1020 is unnecessary because the connectivity pattern of the rotator unit 1012 to the switch units 1020 has been selected so that π=r, as discussed above. Matrices 1310 can be stored in a memory device controlled by a core controller and each is uniquely addressable. The time interval τ during which an input port p of a rotator unit r connects to a specific switch unit h can be determined by examining the entries of a respective column 1350. However, for computational purposes, it is convenient to store an inversion of matrix 1310. An inversion of a matrix 1310-*r* is given in a corresponding matrix 1320-*r*. Each entry in a matrix 1320 is an identifier of a time interval τ during which input port p of rotator unit r connects to a specific switch unit 1020-*s* (represented simply by the index 's' in FIG. 13 for clarity of the figure). A column 1355, corresponding to an input port p of a rotator unit r in a matrix 1320-*r*, includes identifiers of time intervals during which said input port p accesses switch units 1020-0 to 1020-4.

In summary, an entry in a matrix 1310-*r*, corresponding to rotator unit 1012-*r*, indicates an identifier h=χ(τ, r, p) of a switch unit to which an input port p of rotator unit 1012-*r* connects during time-interval τ. For example, input port p=2 of rotator unit 1012-2 (r=2) connects to switch units 1020-*h*, h=2, 4, 1, 3, and 0, respectively, during time intervals τ=0 to τ=4. An entry in a matrix 1320-*r*, corresponding to rotator unit 1012-*r*, indicates a rotation time interval τ=Φ(s, r, p) during which an input port p of rotator unit 1012-*r* connects to a switch unit 1020-*s*. For example, input port p=2 of rotator unit 1012-2 (r=2) is connected during time intervals τ=4, τ=2, τ=0, τ=3, and τ=1, respectively, to switch units 0, 1, 2, 3, and 4 during time interval.

An occupancy state of any switch port may be represented by a one-bit binary number indicating whether the element is free or busy. This state may change with each setup or termination of a connection traversing the switch port. A busy state indicates that the element is either reserved for a forthcoming connection or already engaged in a connection in progress. Arbitrarily, the vacancy state may be referenced as state 0 with the busy state referenced as state 1. This designation (0, 1) may be reversed if so desired. In order to find a path from an input port of any rotator unit 1012 to an outlet port 1028 of any switch unit 1020, occupancy-state matrices are needed to track the occupancy state of each inlet port 1022 of each switch unit 1020 and each outlet port 1028 of each switch unit 1020. Additionally, the occupancy state of each inter-switch-unit channel 1033 is recorded for use in selecting a path traversing two switch units.

Figure 14:
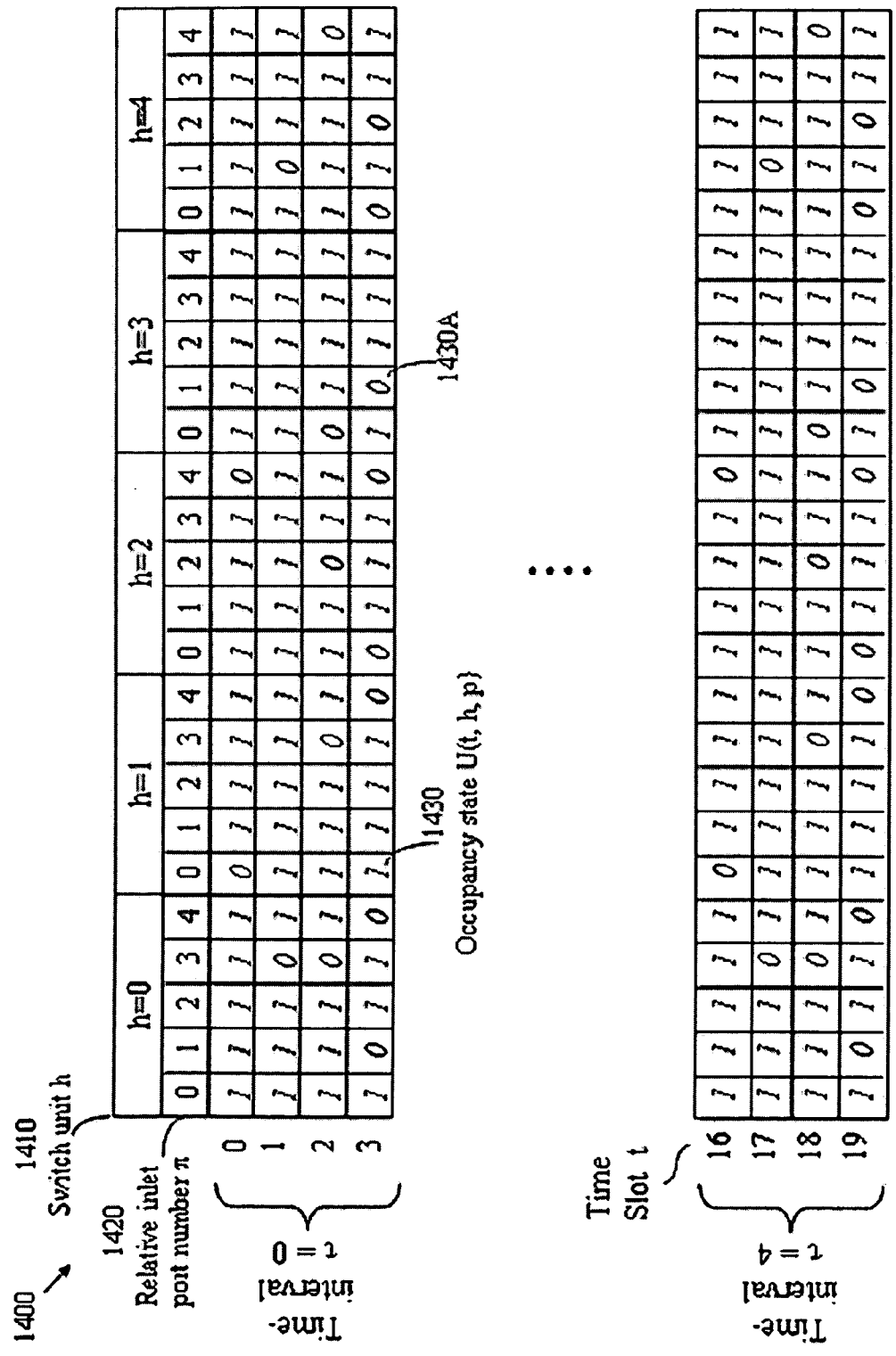
FIG. 14 illustrates a matrix in accordance with the present invention, which indicates the occupancy states of inlet ports of switch units and is usable in a time-slot-matching process of any order.
Figure 15:
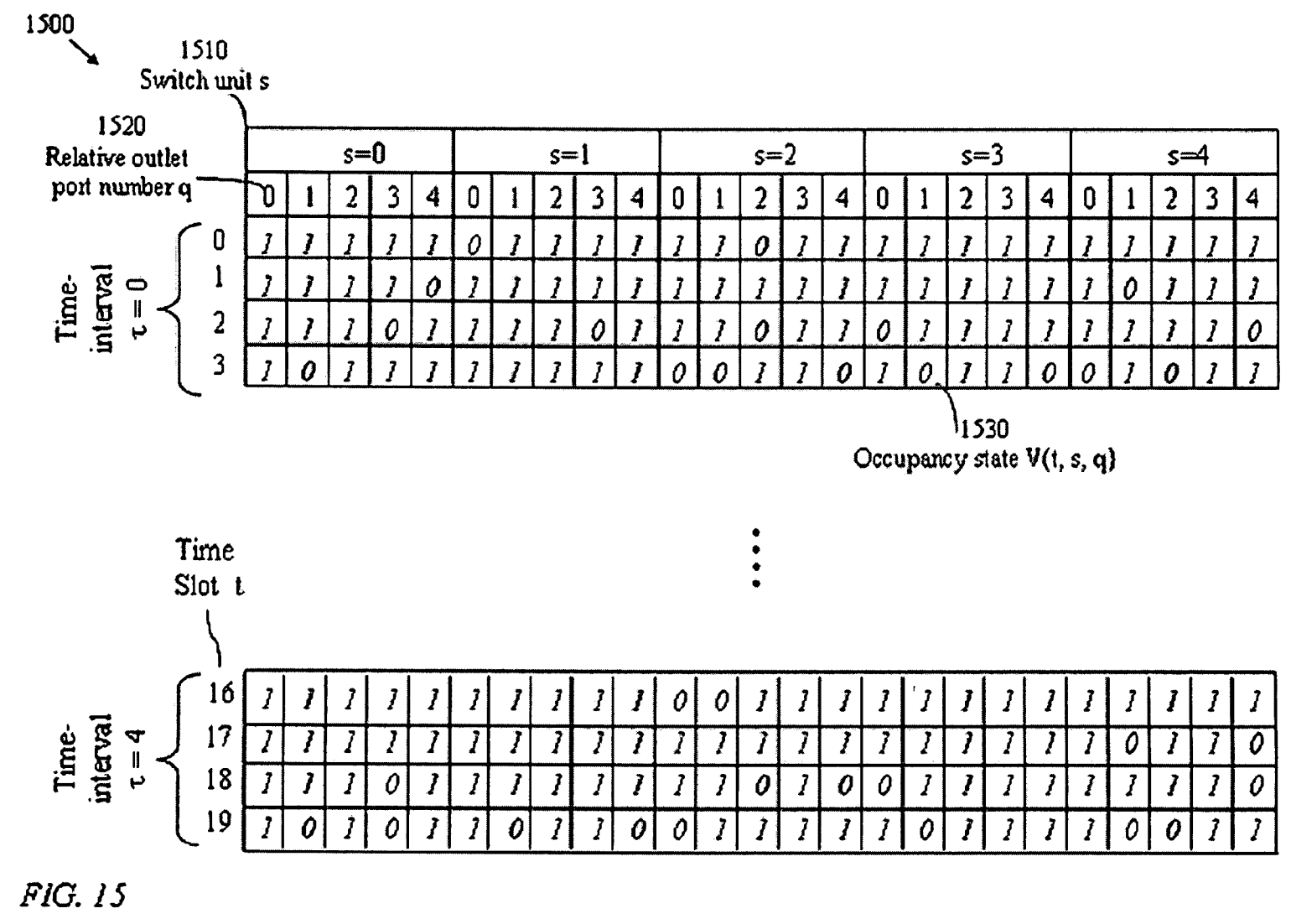

FIG. 14 illustrates an inlet-occupancy-state-matrix 1400 that may be used to record and update the occupancy states of inlet ports 1022 of each switch unit 1020. For each switch unit 1020, labeled A, B, C, D, and E and referenced as 0, 1, 2, 3, and 4, respectively, the occupancy state (0 or 1) of each inlet port 1022 during each time slot is recorded. Header row 1410 identifies five switch units 1020-*h* referenced as h=0 to h=4, with each switch unit 1020 having 5 inlet ports 1022-π referenced in header row 1420 as π, having values of 0 to 4. The columns for each inlet port 1022 contain occupancy states for the inlet port 1022 during the time slot indicated by the row number (0 to 19). There are five time intervals per time frame (π=0 to π=4) with each interval having four time slots; the total number of time slots per time frame being 20. Similarly, FIG. 15 illustrates an outlet-occupancy-state-matrix 1500 having the same structure as matrix 1400 except that header row 1520 identifies outlet ports 1028. Header row 1510 identifies switch units 1020-*s*, s=0, 1, 2, 3, and 4. The outlet-occupancy-state-matrix 1500 can be used to update and record the occupancy state of each outlet port 1028 during each time slot in a time frame. Recall that a switch unit 1020 may change its connectivity every time slot while a rotator unit 1012 changes its connectivity every time interval, where a time interval may include more than one time slots (four in this example).

Matrix 1400 of FIG. 14 has a number of slot-labeled rows equal to the number of time slots per time frame and a number of columns equal to the total number of inlet ports 1022. With a number of time intervals per time frame equal to J (J being the number of output ports per rotator unit 1012 as described earlier) and using ν time slots per time interval, the total number of time slots per time frame is ν×J, preferably numbered as 0 to (ν×J−1). In this illustration, the total number of inlet ports 1022 equals the number of switch-units 1020, times the number of inlet ports 1022 per switch unit 1020. It is noted, however, that the number of inlet ports 1022 per switch unit may differ from one switch unit 1020 to another in alternate embodiments. Each inlet port 1022 is preferably identified by an index, h, of a corresponding switch unit 1020 (header row 1410), and a relative index, π, of said each inlet port 1022 within a switch unit 1020 (header row 1420). An entry (that is, occupancy state) 1430 in matrix 1400 is represented as U(t, h, π), t being an index of a time slot within a time frame, h being an index of a switch unit 1020, and π being a relative index of an inlet-port 1022 number. For example, the occupancy state 1430A represents the occupancy state of switch unit h=3 (that is, 1020D) and inlet port π=1 (that is, D1) at time slot t=3 within time-interval τ=0. FIG. 14 also illustrates the relationship between the time slots t and time intervals τ. There are 5 time intervals, each having 4 time slots, for a total of 20 time slots (labeled 0 to 19).

Matrix 1500 of FIG. 15 has a number of time-slot-labeled rows equal to the number of time slots per time frame and a number of columns equal to the total number of outlet ports 1028. In the illustration of matrix 1500, the total number of outlet ports 1028 equals the number of switch units 1020, times the number of outlet ports 1028 per switch unit 1020. It is noted, however, that the numbers of outlet ports 1028 of switch units 1020 need not be equal. Also, the number of inlet ports 1022 for the entire switch need not equal the number of outlet ports 1028. Each outlet port 1028 is preferably identified by an index, s, of a corresponding switch unit 1020 (header row 1510), and a relative index, q, of an outlet port 1028 within a switch unit 1020 (header row 1520). An entry 1530 in matrix 1500 is represented as V(t, s, q), t being an index of a time slot within a time frame, s being an index of a switch unit 1020-s, and q being an index of a relative outlet-port 1028. FIG. 15 also illustrates the relationship between the time slots t and time intervals τ.

Figure 16:
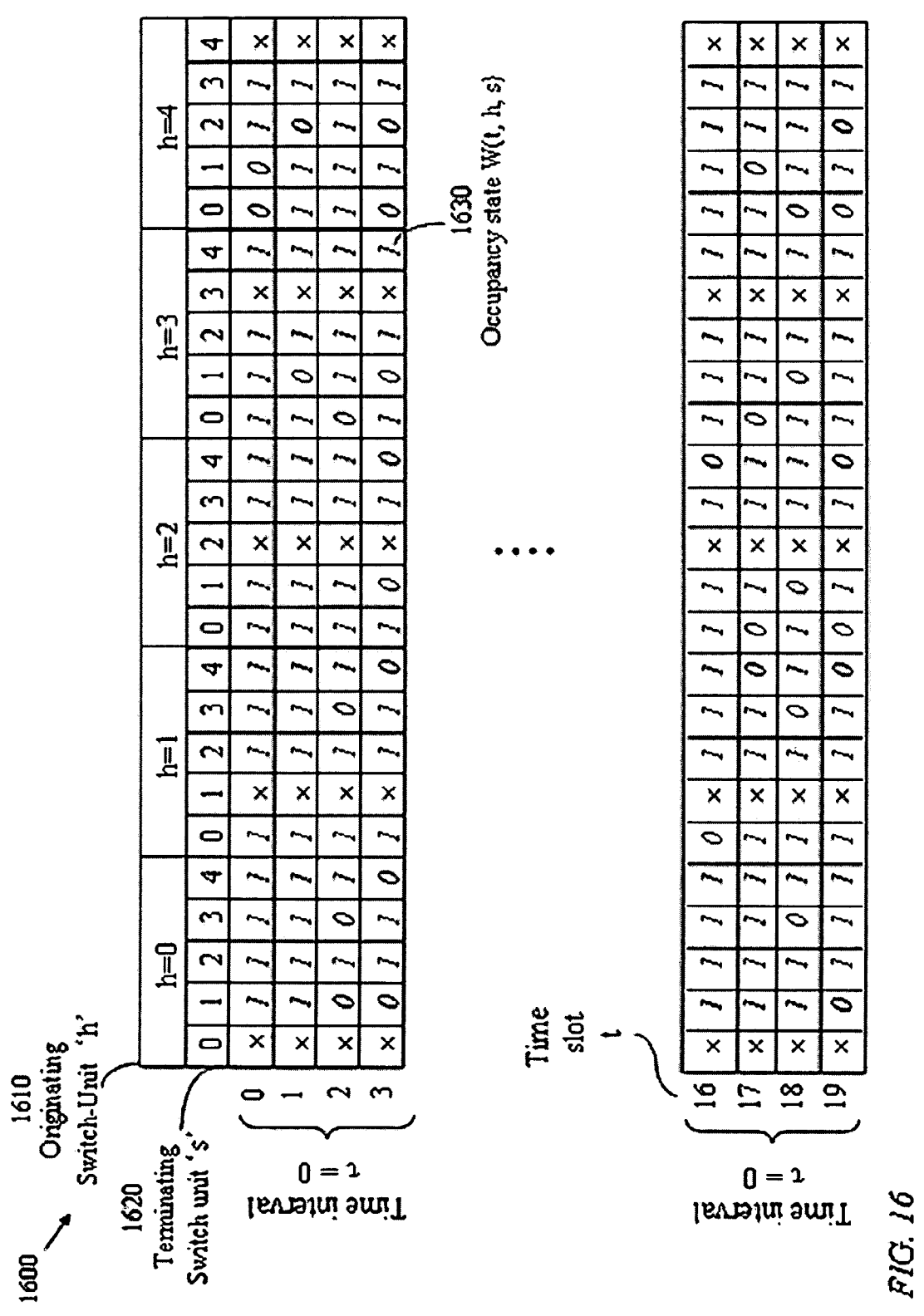

FIG. 16 illustrates a structure of an inter-switch-occupancy-state matrix 1600 of inter-switch-unit channels 1033 during each time-slot of the time frame where the occupancy state is identified as 0 or 1. An inter-switch-unit channel 1033 connects an outward port 1034 of a switch unit 1020 to an inward port 1032 of another switch unit 1020. An inter-switch-unit channel 1033 is identified by an originating switch unit 1020-h from which the channel emanates, indicated by header row 1610 by the index h, and a terminating switch unit 1020-s to which the channel is directed, indicated by header row 1620 by the index s. There are (J−1) inter-switch-module channels 1033 originating from, or terminating to, each switch unit 1020. In the example of FIG. 16, J=5 and the state of four inter-switch-unit channels 1033 per switch unit are recorded. An entry 1630, denoted W(t, h, s), in matrix 1600 indicates the occupancy state (0 or 1), during a time slot t, of a channel 1033 connecting a switch unit 1020-h to a switch unit 1020-s. There is no channel from a switch unit 1020 to itself, hence a cell corresponding to h=s has a null entry "x".

A connection requiring a specified number of time intervals per rotation cycle is established between a source node, i.e., an input port of a rotator unit 1012, and an outlet port 1028 connecting to a sink node. Naturally, intra-edge-node connections from a source node to a sink node of the same edge node 1160 are routed internally within the respective edge node 1160. Because each input port of a rotator unit 1012 (excluding the static rotator unit) connects to inlet ports 1022 of different switch units 1020 over time, connectivity matrices 1210 or 1310 may be used in conjunction with occupancy-state matrices 1400, 1500, and 1600. As described earlier, connectivity matrices 1310, rather than 1210, may be used for determining internal routes within switch 1000. Thus, to find a path from an input port p of rotator unit 1012-j to an outlet port of a switch unit 1020-k, entries of column p of matrix 1310-j (FIG. 13) are read sequentially. An entry in matrix 1310-j identifies a switch unit 1020-x to which input port p is connected during a time interval τ. A channel 1019 from a rotator unit 1012-j connects to an inlet port 1022-j of relative index j in switch unit 1020-x. Matrix 1400 is then examined to determine the occupancy state of the inlet port 1022-j during successive time slots t. If the inlet port 1022-j is free, outlet-occupancy matrix 1500 is examined to determine the occupancy state of the target outlet port. Matrix 1600 is then examined to determine the occupancy state of the channel 1033 from switch unit 1020-x to switch unit 1020-k. If the channel is free at time slot t, the path traversing the inlet port 1022, the outlet port 1028, and the channel 1033 connecting switch units 1020-x and 1020-k is selected for time slot t and corresponding entries in matrices 1400, 1500, and 1600 are marked accordingly.

Time-Frame Packing

It is well known in the art that temporal connection packing in a switch requiring a first-order time-slot-matching process can significantly reduce the incidence of connection blocking caused by mismatch of vacant time slots and, hence, increase the throughput of the switch. As described in Applicant's United States Patent Publication No. 2004/0037558 entitled "Modular High-Capacity Switch," temporal connection packing is even more crucial when higher-order time-slot matching processes are required. In order to facilitate the use of temporal connection packing in the mesh-structured switch 1000 of FIG. 10, a column 1350 of matrix 1310 (FIG. 13) corresponding to the rotator unit 1012 to which the source edge node is connected, should be read sequentially, starting from the same row (row τ=0, for example), for each connection request. In the case of the meshed structure of FIG. 10, attempting to find a preferred rotation time-interval for a path through the same switch unit 1020 of the target outlet port 1028 may disrupt a temporal-packing process. The benefit of intra-switch-unit switching is significant, as it avoids the use of an inter-switch-unit channel 1033, and the benefit may outweigh the negative effect of disrupting the temporal-packing process. Therefore, the identifier of the target switch unit is used to index column 1355 of a matrix 1320 corresponding to the rotator-unit input port (and corresponding source edge node) to determine a preferred time interval during which an intra-switch-unit path is attempted. In a first phase, the preferred time interval is considered. If a path is not found, or if a path is found but the connection requires more time slots per time frame, a second phase is initiated where column 1350 is scanned in a predetermined order, sequentially for example, starting from a pre-selected reference row number (conveniently row τ=0). The entry in column 1350 corresponding to the preferred time interval (which has already been considered) may be excluded to avoid unnecessary processing.

Embodiments of the present invention comprise operable logic adapted to perform methods of the present invention. These methods may include, for example, creating and updating matrices, tables, etc., such as occupancy-state matrices. That is, the operable logic executes the methods of the present invention. The operable logic of the present invention can be implemented as a set of computer program instructions that are stored in a computer-readable medium and executed by an embedded microprocessor system within devices made in accordance with the present invention. Embodiments of the invention may be implemented, in whole or in part, in any conventional computer programming language. For example, preferred embodiments may be implemented in a procedural programming language (for example, "C") or an object oriented programming language (for example, "C++"). Alternate embodiments of the invention may be implemented, in whole or in part, utilizing discrete components, integrated circuitry, programmable logic used in conjunction with a programmable logic device such as a Field Programmable Gate Array (FPGA) or microprocessor, or any other means including any combination thereof. Additional embodiments of the invention may be implemented, in whole or in part, as a computer program product for use with a computer system. Such implementation may include a series of computer instructions fixed either on a tangible medium, such as a computer-readable media (for example, a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality described herein with respect to the present invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over a network (for example, the Internet or World Wide Web).

Embodiments of the present invention comprise one or more controllers that execute operable logic of the present invention. Thus, the operable logic of the present invention also may be referred to herein as control logic. The control logic may be executed on a single controller or may be executed on multiple controllers.

The present invention as described herein may refer to matrices, associations, mappings, or correspondences. For example, embodiments of the present invention may comprise one or more occupancy-state matrices. As is known in the art of implementing operable logic as described above (including the art of computer programming, for example), these, and other, matrices, associations, mappings, and correspondences typically manifest themselves, for example, either as programming data structures (either separate from or embedded in the operable logic) to keep track of and manipulate the matrices, associations, mappings, and correspondences or, alternately, can manifest themselves in the procedural aspects of the operable logic itself.

Connection Scheduling in a Switch Having a Balanced Meshed Core

A connection request specifies a source edge node, a sink edge node, and a number $\mu \geq 1$ of time slots per time frame. The source edge node is uniquely identified by a rotator-unit number r ($0 \leq r < J$) and a relative input-port number p of the rotator unit r. The sink node is uniquely identified by a switch-unit number s ($0 \leq s < J$) and a relative outlet-port number q of the switch unit s. Each source node may be paired with a sink node with which it shares memory and control, thus forming an integrated edge node. An edge node transmits signals through an input port of a rotator unit and receives signals from an outlet port of a switch unit. An edge node may connect to any input port of any rotator unit and to any outlet port of any switch unit. An edge node, however, has a rotating upstream access to each switch unit but a fixed downstream access to one switch unit.

Figure 17:
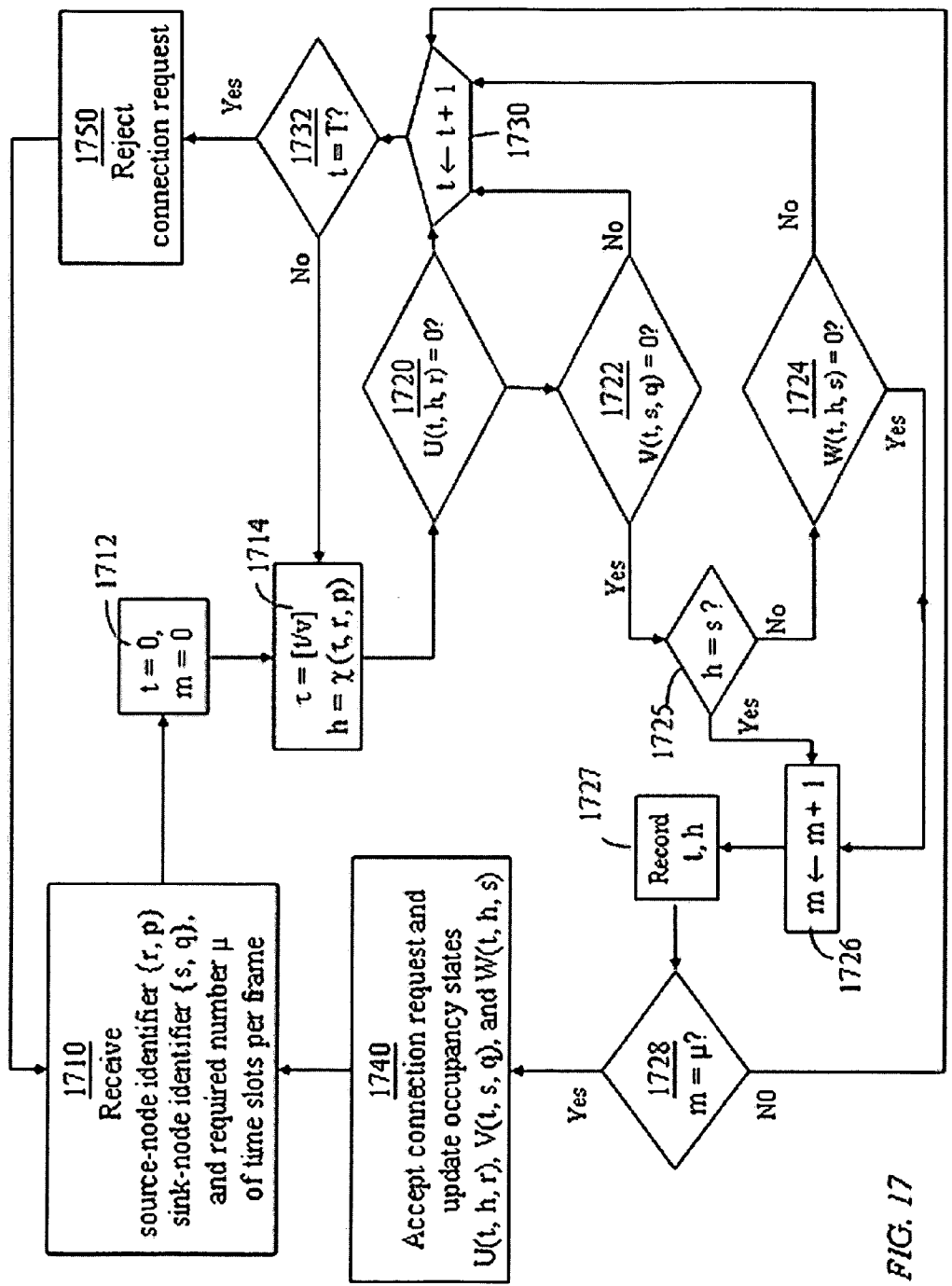
FIG. 17 illustrates a flow chart of a path-finding process in the meshed switch of FIG. 11.

FIG. 17 illustrates a flow chart indicating the main steps of a process for setting-up a connection in the switching system of 1100 of FIG. 11. In the process of FIG. 17, the search for an allocable time slot starts from time slot t=0 of the time frame and proceeds sequentially towards the end of the time frame containing T time slots. The number v of time slots per time interval and the number T of time slots per time frame are design parameters provided to the scheduler implementing the process of FIG. 17. Following this search order for each connection request results in occupancy packing and increases the throughput of the switch. A source node connected to rotator unit 1012-r, referenced simply by the index 'r', at input port 'p' is identified by the coordinates $\{r, p\}$. A sink node connected to switch unit 1020-s, referenced simply by the index 's', at outlet port 'q' is identified by the coordinates $\{s, q\}$. For convenience, the connectivity of each rotator unit is selected so that the relative inlet-port number $\pi$ of a switch unit 1020 to which a rotator unit 'r' connects equals r ($\pi$=r). That is, rotator 0 connects to inlet port number $\pi$=0 of each switch unit 1020, rotator 1 connects to inlet port number 1 of each switch unit 1020, etc. This selection is only exemplary and many other connection patterns may be useful in other embodiments of the present invention. Each source node $\{r, p\}$ has rotating access to the switch units 1020 but each sink node $\{s, q\}$ has a fixed access to a switch unit 1020. The core controller 1150 (FIG. 11) receives a connection request (step 1710) from a source node. The core controller determines the source node coordinates $\{r, p\}$, the sink node coordinates $\{s, q\}$, and the required number $\mu > 0$ of time slots per time frame. In step 1712, an initial time slot in the time frame is arbitrarily selected as t=0 and an integer variable m, to be used to track the number of allocated time slots per time frame, is initialized to equal zero. It is noted that the rotator interval may contain an integer number of time slots and, therefore, the rotator connectivity is a function of the time-interval index $\pi$ not the time-slot index t. In step 1714, the time-interval index $\pi$ is determined as the integer part of the ratio t/v, denoted $\lfloor t/v \rfloor$, where v is the number of time slots per time interval (a fixed parameter). The switch unit h to which the input port p of rotator r is connected through the rotator's fabric at the current time slot t is determined as: h=$\chi(\tau, r, p)$, where $\tau = \lfloor t/v \rfloor$ and the function $\chi$ (corresponding to entry 1330 in FIG. 13) is defined by rotator-unit connectivity matrix 1310.

In step 1720, the occupancy state, denoted U(t, h, $\pi$), of inlet port $\{h, \pi\}$ during time slot t is read from inlet-occupancy-state matrix 1400 ($\pi$ preferably equals r as described earlier). If the inlet port $\{h, \pi\}$ is busy (i.e., U(t, h, $\pi$)=1) during time slot t, another time slot may be selected in step 1730. Otherwise, the occupancy state, denoted V(t, s, q), of the target outlet port $\{s, q\}$ during time slot t is read from outlet-occupancy-state matrix 1500 in step 1722. If the outlet port $\{s, q\}$ is busy (i.e., V(t, s, q)=1) during time slot t, another time slot may be selected in step 1730 and steps 1714 and 1720 are repeated. Otherwise, having determined that both the inlet port $\{h, \pi\}$ and outlet port $\{s, q\}$ are free during time slot t, the switch-unit identifier h is compared with switch-unit identifier s in step 1725. If h equals s, it is determined that the inlet port and the outlet port reside on the same switch unit 1020 and the process continues to step 1726. Each switch unit is internally non-blocking and, hence, a path from a free inlet port to a free outlet port of the same switch unit h (1020-h) is guaranteed. If h is not equal to s, the occupancy state, herein denoted W(t, h, s), of the inter-switch-unit channel connecting an outward port of switch unit h to an inward port of switch unit s is determined from inter-switch-unit-occupancy-state matrix 1600. If W(t, h, s) equals 1, indicating a busy state, another time slot may be selected in step 1730 and steps 1714 and 1720 are repeated. Otherwise, the process continues to step 1726. In step 1726, the record m of the number of allocable time slots per time frame is increased by one and in subsequent step 1727 a record is made of parameters t and h indicating an allocable time slot for the requested connection. The record is treated as a tentative record if the required number $\mu$ of time slots is greater than unity, in which case the connection may be accepted only if a sufficient number of time slots is allocated. In step 1728, following step 1727, the allocable number m of time slots is compared with the required number $\mu$. If m is less than $\mu$, the process continues to step 1730 where another time slot may be considered.

Otherwise, if m equals μ, the process continues to step 1740. It is noted that the number m cannot possibly exceed μ because the connection setup process terminates when m equals μ. In step 1740, the connection request is determined to be acceptable and for each of the parameter sets (t, h) accumulated in step 1727, entries U(t, h, π) in matrix 1400 (using π=r) and V(t, s, q) in matrix 1500 are marked as busy. If the connection requires an inter-switch-unit channel (i.e., if h≠s), then each respective entry W(t, h, s) in matrix 1600 is also marked as busy; the respective entries are determined from the parameters set (t, h) accumulated in tentative records in step 1727. It is noted that the input parameters r, p, s, and q remain unchanged throughout the process of FIG. 17, i.e., the values of r, p, s, and q associated with a connection request are the same for all allocable time slots. The core controller 1150 (FIG. 11) then communicates the allocable time slots to the respective edge node. Naturally, when a connection in progress is terminated, the core controller marks the allocated entries U(t, h, π)|$_{π=r}$, V(t, s, q), and, where applicable, W(t, h, s), as free for each time slot previously allocated to the terminated connection.

In step 1730, the time-slot index t is increased by unity. In subsequent step 1732, if it is determined that t=T, i.e., all the time slots of the time frame have been considered, the connection setup process is terminated. In step 1750, the connection request is rejected and a rejection message is sent to the edge node. Following acceptance (step 1740) or rejection (step 1750) of a connection request, the process returns to the starting step 1710 to process a waiting connection request or to wait for a forthcoming connection request.

Figure 18:
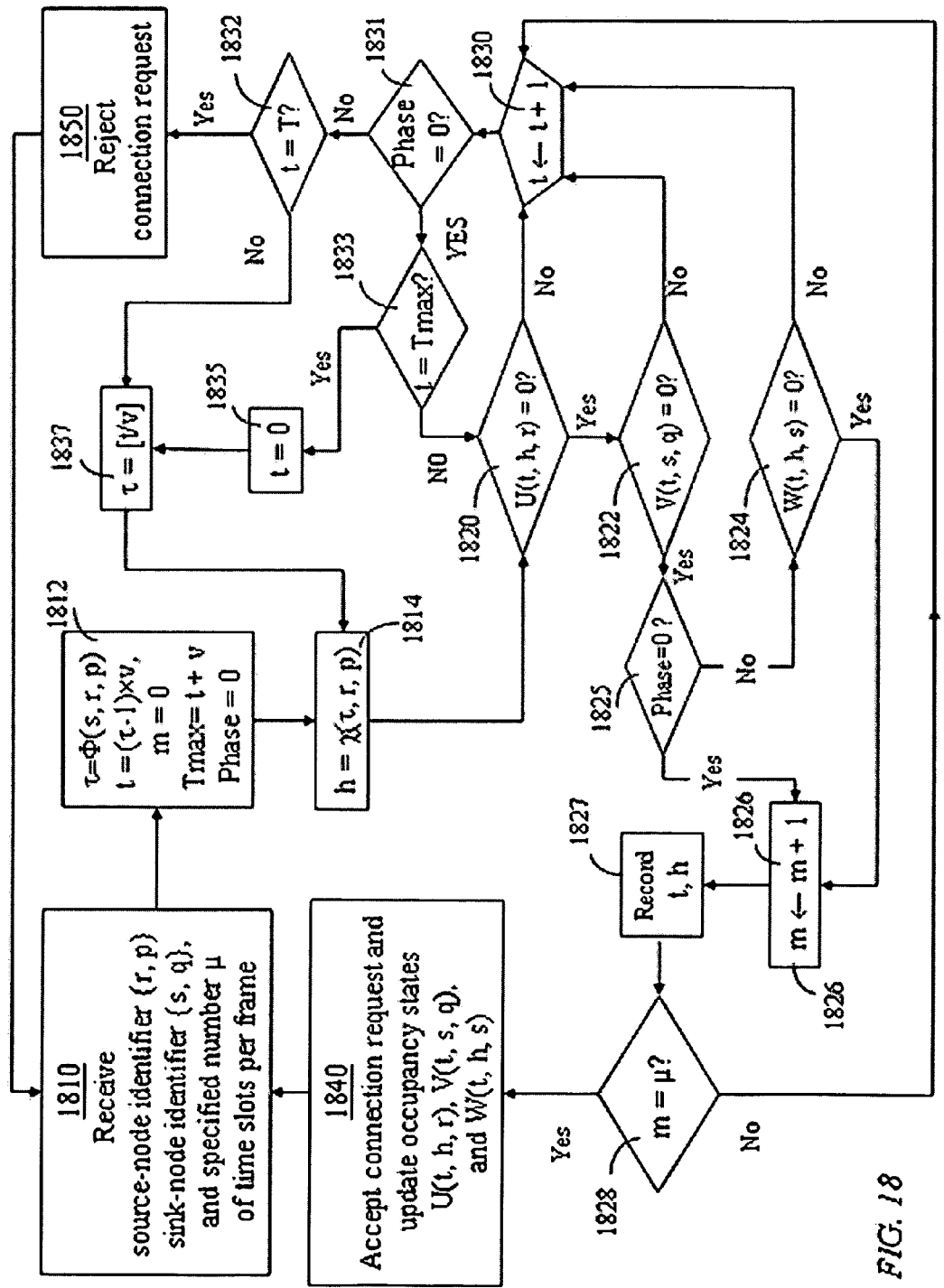
FIG. 18 illustrates a flow chart of a path-finding process in the meshed switch of FIG. 11 where direct connections are given priority.

FIG. 18 illustrates a flow chart of a path-finding process in the meshed switch of FIG. 11, wherein direct connections are given priority. The flow chart indicates the main steps of setting-up a connection in the switching system 1100 of FIG. 11. Although many of the steps of FIG. 18 are similar to steps in FIG. 17, the entire process of FIG. 18 is described for clarity. A source node connected to rotator unit 1012-*r* at input port p is identified by the coordinates {r, p}. A sink node connected to switch unit 1020-*s* at outlet port q is identified by the coordinates {s, q}. For convenience, the connectivity of each rotator unit is selected so that the relative inlet-port number of a switch unit to which a rotator unit r connects equals r. The core controller 1150 receives a connection request (step 1810) from a source node and determines the source node coordinates {r, p}, the sink node coordinates {s, q} and the required number μ>0 of time slots per time frame.

For a connection from a source node to a sink node, the connection setup process of FIG. 18 starts with the time interval during which the source node and the sink node are connected to the same switch unit. During the selected rotation time interval, herein called the preferred rotation time interval, any number of time slots less than or equal to the number ν of time slots per time interval may be allocated for the connection. If the number of allocable time slots during the selected interval is less than the required number μ of time slots for the connection, the search for further allocable time slots restarts from time slot t=0 of the time frame and proceeds sequentially towards the end of the frame. Thus, unlike the process of FIG. 17, priority is given to the preferred time interval during which a direct path can be established in the process of FIG. 18.

In step 1812, the preferred rotation time interval during which input port p of rotator unit r connects to switch unit s which hosts the sink node specified in the connection request is determined as τ=Φ(s, r, p) where the function Φ is given in the tabulated form in FIG. 13 (matrices 1320). The connection request is processed in two phases. In a first phase (phase 0) the preferred rotation time interval having ν time slots is used. If the number of allocable time slots is insufficient, a second phase (phase 1) is executed. An indicator of a phase of the process is set to equal zero (phase=0) in step 1812. An initial time slot index t is then determined as t=(τ−1)×ν, which points to the first time slot of the selected (preferred) rotation interval τ. The number m of allocable time slots is then initialized to equal zero and an index Tmax (Tmax≤T) of a time slot immediately following the last time slot of the preferred rotation time interval is determined as Tmax=t+ν. In step 1814, the switch unit corresponding to the current rotation time interval τ is determined as h=Φ(τ, r, p). Step 1820 then determines if the inlet port π(π=r) of switch unit h is free. If the inlet port is busy, i.e., already assigned, the process continues to step 1830 to select a succeeding time slot, if any. Otherwise, the process continues to step 1822 to determine if the outlet port q of switch unit s is free during time slot t. If the outlet port is busy, the process continues to step 1830. Otherwise, step 1825 is executed to determine if the process is still in phase 0 (where both h and s refer to the target switch unit 1020-*s*). It is noted that the value of s is specified by the connection request but the value of h changes every rotation time interval. If the phase equals zero, a direct connection from inlet port {h, r} to outlet port {s, q} is feasible through switch unit h (which is also s). The process then continues to step 1826. Otherwise, if step 1825 determines that the phase value is not zero, i.e., that h and s refer to different switch units 1020, step 1824 is executed to determine if the internal channel connecting switch unit h to switch unit s is free. If the internal channel is busy, the process continues to step 1830 to select a subsequent time slot, if any.

When step 1830 is reached, the time-slot index t is advanced by one and the new value of the time-slot index is used to determine if subsequent time slots may be tried. Step 1830 may be reached either during the preferred rotation time interval of the first phase or during the sequential selection of rotation time intervals of the second phase. The upper bounds for the value of the index t differs between the two phases and, therefore, step 1831 is executed and if the connection allocation is still in the first phase the process continues to step 1833 to determine if all the time slots in the preferred rotation interval have been considered, i.e., if t is less than Tmax. If t<Tmax, the process continues to step 1820. Otherwise, the process continues from step 1833 to step 1835 to set the phase value to 1 and to initialize the time-slot index to t=0 then continue to step 1837 which determines the time-interval r corresponding to time slot t. Following step 1837, steps 1814, 1820, 1822, and 1825 are executed as described above. When the phase value is 1, step 1825 is followed by step 1824 to determine if the channel connecting switch unit h to switch unit s is free during the current time slot t.

In step 1826, the record of the number of allocable time slots per time frame is increased by one and in subsequent step 1827 a record is made of parameters t and h indicating an allocable time slot for the requested connection. The record is treated as a tentative record if the required number μ of time slot is greater than unity, in which case the connection may be accepted only if a sufficient number of time slots is allocated. In step 1828, following step 1827, the allocable number m of time slots is compared with the required number μ. If m is less than μ, the process continues to step 1830 where another time slot may be considered. Otherwise, if m equals p, the process continues to step 1840. The number m cannot possibly exceed p because step 1828 terminates the connection setup process if m equals μ. In step 1840, the connection request is determined to be acceptable and for each of the parameter sets (t, h) accumulated in step 1827, entries U(t, h, r) in matrix 1400 and V(t, s, q) in matrix 1500 are marked as busy. If the connection requires an inter-switch-unit channel, then each respective entry W(t, h, s) in matrix 1600 is also marked as busy. The values of r, s, and p are determined from the connection request under consideration. The core controller then communicates the allocated time slots to the respective edge node. Naturally, when a connection in progress is terminated, the core controller marks the allocable entries U(t, h, r), V(t, s, q), and, when applicable, W(t, h, s), as free for each time slot previously allocated to the terminated connection (p preferably equals r as described earlier).

In step 1830, the time-slot index t is increased by unity. In subsequent step 1832, if it is determined that t=T, i.e., all the time slots of the time frame have been considered, the connection setup process is terminated. In step 1850 the connection request is rejected and a rejection message is sent to the edge node.

Following acceptance (step 1840) or rejection (step 1850) of a connection request, the process returns to the starting step 1810 to process a waiting connection request or to wait for a forthcoming connection request.

When the second phase is reached, the time slots corresponding to the preferred rotation time interval, which have already been considered in the first phase, would be encountered during the second phase. However, any allocable time slots, i.e., time slots that are free along a path from inlet port (h, r) to outlet port (s, q), would have been allocated during the first phase. The second phase is reached only if the number of allocable time slots in the first phase, if any, is less than the number μ of time slots per time frame as specified in a respective connection request. Thus, in the second phase, at least one of steps 1820, 1822, or 1824 would lead to step 1830. It may be desirable however, during the second phase, to avoid processing the time slots of the preferred rotation time interval.

In accordance with the present invention, novel switching systems and path-finding methods have been provided. While the present invention has been shown and described herein with reference to specific embodiments thereof, it should be understood by those skilled in the art that variations, alterations, changes in form and detail, and equivalents may be made or conceived of without departing from the spirit and scope of the invention. For example, a person skilled in the art realizes that other procedures may be devised based on the same path-finding approach described with reference to FIGS. 12 to 18. Any of the processes of FIGS. 17 or 18 may be modified to allow concurrent processing of more than one connection request using, for example, process pipelining. While the invention has been described herein using apparatus and methods based on the generic scheme of FIG. 3, with induced inner-traffic balance based on the use of a pre-switching balanced-connector, embodiments can be structured to be based on the generic scheme of FIG. 4 which employs a post-switching balanced-connector to realize inner-traffic balance. Accordingly, the scope of the present invention should be assessed as that of the appended claims and by equivalents thereto.

What is claimed is:

1. A balanced, bufferless switch, comprising:
   a plurality of bufferless optical switch units, each bufferless optical switch unit comprising:
      a plurality of inlet ports;
      a plurality of outlet ports wherein at least one outlet port is connected to an edge node;
      a plurality of outward ports connected to each other bufferless optical switch unit; and
      a plurality of inward ports connected to outward ports of each other bufferless optical switch unit of said plurality of bufferless optical switch units; and
   a pre-switching balanced connector having:
      a plurality of output ports connected to the inlet ports of the plurality of bufferless optical switch units: and
      a plurality of input ports, at least one input port of the plurality of input ports connected to the edge node.

2. The switch of claim 1, wherein, during successive time intervals in a time frame having a predefined number of time intervals, said pre-switching balanced connector cyclically connects each input port of said plurality of input ports to a respective inlet port of at least two bufferless optical switch units of said plurality of bufferless optical switch units.

3. The switch of claim 2, wherein said pre-switching balanced connector comprises a single rotator.

4. The switch of claim 2 wherein said pre-switching balanced connector comprises a plurality of rotator units.

5. The switch of claim 4, wherein said rotator units are temporally cyclic and have different rotation steps, a rotation step being a spatial separation between optical switch units to which an input port of said pre-switching balanced connector connects during successive time intervals of said time frame.

6. The switch of claim 2 wherein during any two successive time intervals of said time frame each input port of said pre-switching balanced connector connects to inlet ports of different bufferless optical switch units of said plurality of bufferless optical switch units.

7. The switch of claim 2, wherein during said time frame each input port of said pre-switching balanced-connector connects to each bufferless optical switch unit of said plurality of bufferless optical switch units through said pre-switching balanced-connector.

8. A balanced, bufferless switch, comprising:
   a plurality of bufferless optical switch units, each bufferless optical switch unit comprising:
      a plurality of inlet ports;
      a plurality of outlet ports;
      a plurality of outward ports connected to each other bufferless optical switch unit; and
      a plurality of inward ports connected to outward ports of each other bufferless optical switch unit of said plurality of bufferless optical switch units; and
   a post-switching balanced connector having:
      a plurality of input ports connected to the outlet ports of said plurality of bufferless optical switch units; and
      a plurality of output ports.

9. The switch of claim 8, wherein, during successive time intervals in a time frame having a predefined number of time intervals, said post-switching balanced connector cyclically connects each output port of said plurality of output ports to a respective outlet port of each bufferless optical switch unit of said plurality of bufferless optical switch units.

10. The switch of claim 9, wherein said post-switching balanced connector comprises a single rotator.

11. The switch of claim 9, wherein said post-switching balanced connector comprises a plurality of rotator units.

12. The switch of claim 11, wherein said rotator units are temporally cyclic and have different rotation steps, a rotation step being a spatial separation between bufferless optical switch units to which an output port of said post-switching balanced connector connects during successive time intervals.

13. The switch of claim 9, wherein during any two successive time intervals of said time frame each output port of said plurality of output ports connects to outlet ports of different bufferless optical switch units of said plurality of bufferless optical switch units.

14. The switch of claim 9, wherein during said time frame each output port of said plurality of output ports connects to each bufferless optical switch unit of said plurality of bufferless optical switch units.

15. A method of scheduling a connection during a time frame having a plurality of time slots, the method comprising:
- determining, by a controller of a switching system, the switching system comprising a switch fabric having a plurality of switch units and a pre-switching balanced connector, a number $\mu$ of needed time slots for a connection from an input port of the pre-switching balanced connector to an outlet port of one of the switch units, each of the switch units having a plurality of inlet ports connected to a respective plurality of output ports of the pre-switching balanced connector;
- checking, by said controller occupancy state of a path from the input port of the pre-switching balanced connector to the outlet port of one of the switch units through the switching system during a time slot and marking the time slot as allocable if the path during the time slot is unoccupied; and
- repeating, by said controller, the checking step for additional time slots in the time frame until either $\mu$ time slots have been marked as allocable or all time slots in the time frame have been checked.

16. The method of claim 15 further comprising determining, prior to said checking, a switch unit from among said plurality of switch units, to which said input port of the pre-switching balanced connector connects during said time slot.

17. The method of claim 15 further comprising determining time slots during which the input port of the pre-switching balanced connector and the outlet port of one of the switch units are connected to the same switch unit, prior to checking a time slot.

18. A method of scheduling a connection during a time frame having a plurality of time slots, the method comprising:
- determining, by a controller of a switching system, the switching system comprising a switch fabric having a plurality of switch units and a post-switching balanced connector, a number $\mu$ of needed time slots for a connection from an inlet port of one of the switch units to an output port of the post-switching balanced connector, each of the switch units having a plurality of outlet ports connected to a respective plurality of input ports of the post-switching balanced connector;
- checking, by said controller occupancy state of a path from the inlet port of one of the switch units to said output port of the post-switching balanced connector through the switching system during a time slot and marking the time slot as allocable if the path during the time slot is unoccupied; and
- repeating, said controller, the checking step for additional time slots in the time frame until either $\mu$ time slots have been marked as allocable or all time slots in the time frame have been checked.

19. The method of claim 18 further comprising determining, prior to said checking, a switch unit, from among said plurality of switch units, to which said output port of the post-switching balanced connector connects during said time slot.

20. The method of claim 18 further comprising determining time slots during which the inlet port of one of the switch units and said output port of the post-switching balanced connector are connected to the same switch unit, prior to checking a time slot.

* * * * *